United States Patent
van der Tuijn

(10) Patent No.: US 6,411,611 B1
(45) Date of Patent: Jun. 25, 2002

(54) COMMUNICATION SYSTEMS, COMMUNICATION METHODS AND A METHOD OF COMMUNICATING DATA WITHIN A DECT COMMUNICATION SYSTEM

(75) Inventor: Roland van der Tuijn, Mougins (FR)

(73) Assignee: Koninklijke Phillips Electronics N.V., Eindhoven (NL)

( * ) Notice: Subject to any disclaimer, the term of this patent is extended or adjusted under 35 U.S.C. 154(b) by 0 days.

(21) Appl. No.: 09/080,647

(22) Filed: May 18, 1998

(51) Int. Cl.$^7$ .............................. H04B 7/212; H04J 3/00
(52) U.S. Cl. ...................... 370/337; 370/330; 370/347; 370/442; 455/426
(58) Field of Search .............................. 370/328, 329, 370/330, 336, 337, 343, 344, 347, 442; 455/422, 426, 434, 450

(56) References Cited

U.S. PATENT DOCUMENTS

| | | | |
|---|---|---|---|
| 5,134,615 A | * 7/1992 | Freeburg et al. ............ 370/347 |
| 5,212,684 A | 5/1993 | MacNamee et al. .......... 370/24 |
| 5,412,650 A | 5/1995 | Davies ........................ 370/82 |
| 5,416,778 A | 5/1995 | Chan et al. ................ 370/95.1 |
| 5,418,838 A | 5/1995 | Havermans et al. .......... 379/60 |
| 5,459,873 A | 10/1995 | Moore et al. ................ 455/277 |
| 5,471,671 A | * 11/1995 | Wang et al. ............ 455/226.2 |
| 5,515,366 A | * 5/1996 | Chieu et al. ................ 370/347 |
| 5,544,226 A | 8/1996 | Weis et al. .................... 379/61 |
| 5,570,370 A | * 10/1996 | Iin .............................. 370/347 |
| 5,732,076 A | * 3/1998 | Ketseoglou et al. ........ 370/347 |
| 5,796,730 A | * 8/1998 | Bellec ........................ 370/347 |
| 6,018,528 A | * 1/2000 | Gitlin et al. ................ 370/436 |
| 6,154,642 A | * 11/2000 | Dumont et al. ............. 455/403 |

OTHER PUBLICATIONS

Product Brochure: "Digital Enhanced Cordless Telecommunications (DECT)," XSYS New Media Technologies Group, May, 1996; pp. 1–33.
ETSI Publication: "Radio Equipment and Systems (RES); Digital European Cordless Telecommunications (DECT) Common interface Part 1: Overview," European Telecommunications Standards Institute, Oct., 1992; pp. 1–30.
ETSI Publication: "Radio Equipment and Systems (RES); Digital European Cordless Telecommunications (DECT) Common interface Part 2: Physical layer," European Telecommunications Standards Institute, Oct., 1992; pp. 1–39.
DECT Publication: "VP23001 Radio Interface Application Note," Ver. 1.10, Feb., 1996, pp. 1–30.
Gibson, Jerry D., *The Communications Handbook*, CRC Press 1997, pp. 1305–1326.

* cited by examiner

Primary Examiner—David Vincent
Assistant Examiner—Bob A. Phunkulh
(74) Attorney, Agent, or Firm—Peter Zawilski

(57) ABSTRACT

The present invention includes communication systems, communication methods and a method of communicating data within a DECT communication system. One embodiment of the present invention provides a communication system including a radio having a synthesizer operable to generate a carrier signal responsive to frequency data, the radio being configured to communicate a plurality of slots using the carrier signal; a control processor configured to generate control information regarding the slots; and a data processor coupled with the radio and the control processor, the data processor being configured to use the control information to identify a first slot and a subsequent slot responsive to the identification of the first slot, the data processor being further configured to control the output of frequency data to the radio responsive to the identification of the first slot and the second slot.

51 Claims, 14 Drawing Sheets

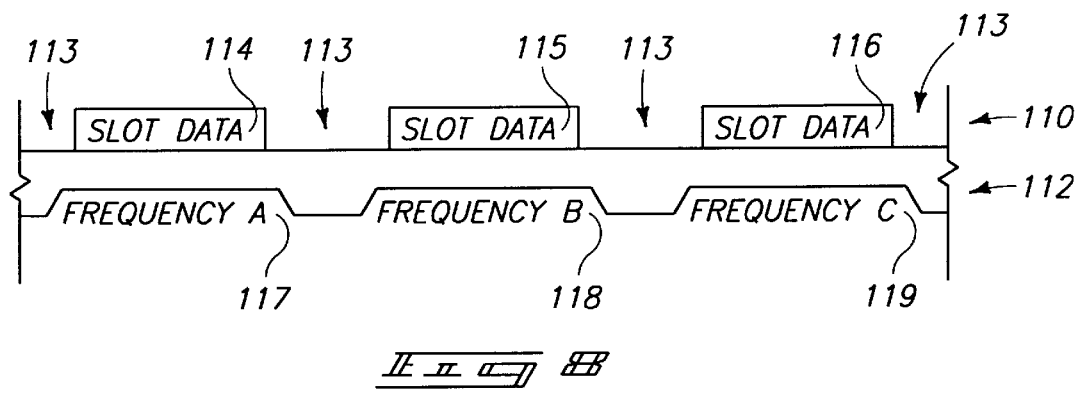
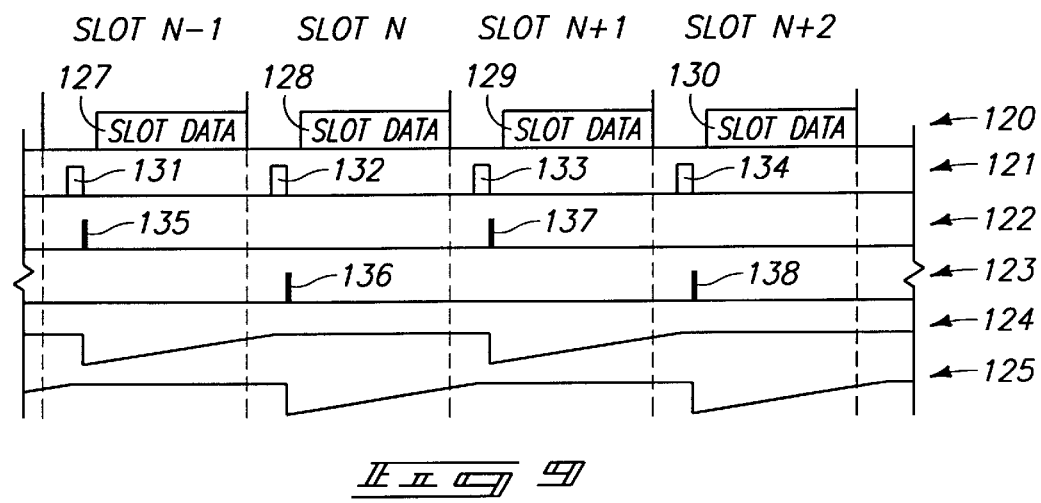
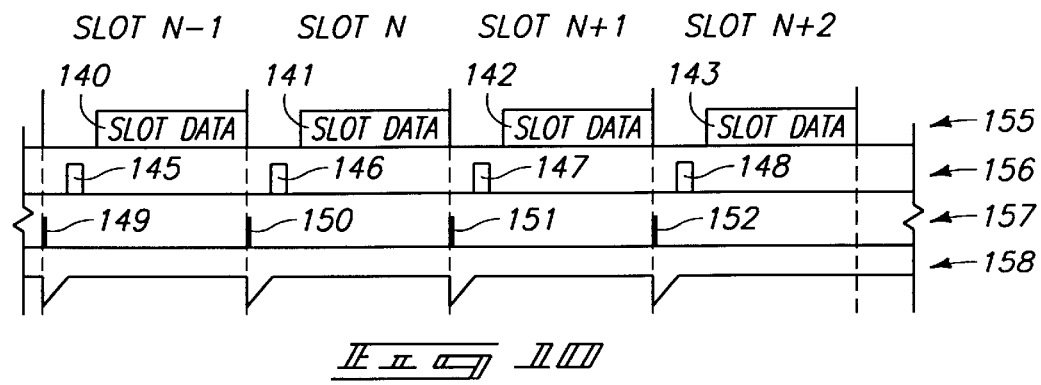

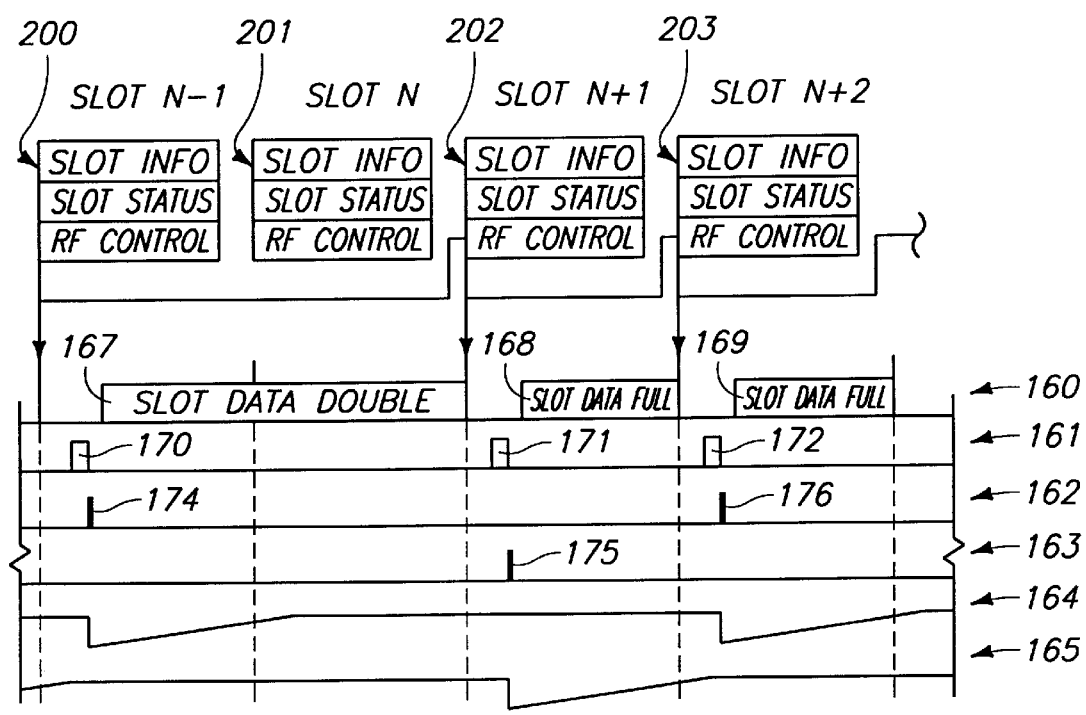

COMMUNICATION SYSTEMS, COMMUNICATION METHODS AND A METHOD OF COMMUNICATING DATA WITHIN A DECT COMMUNICATION SYSTEM

TECHNICAL FIELD

The present invention relates to communication systems, communication methods and a method of communicating data within a DECT communication system.

BACKGROUND OF THE INVENTION

Cordless communication systems typically include a handset station coupled via a radio connection with a base station. The base station is usually connected by wire to a telecommunications network, such as a traditional Public Switched Telephone Network (PSTN) or an Integrated Services Digital Network (ISDN).

Ease and convenience of use has expanded applications and popularity of cordless communication systems. Responsive to such increased popularity and applications, new standards have been introduced including digital communication standards. The development of new cordless standards based upon digital technology are useable in a broad spectrum of applications. Exemplary cordless applications include wireless Private Automatic Branch Exchange (PABX), wireless Local Area Network (LAN), Telepoint, and Radio Local Loop. Exemplary cordless standards include Digital Enhanced Cordless Telecommunications (DECT), GSM, PHS, AMPS, IS54 or IS95. One exemplary benefit of digital cordless telephones is the provision of a valid alternative to cellular phones in densely populated areas.

The Digital Enhanced Cordless Telecommunications standard is a cordless standard defined as a Multicarrier (MC), Time Division Multiple Access (TDMA)/Time Duplex Division (TDD) system. The Digital Enhanced Cordless Telecommunications standard is discussed generally in Jerry D. Gibson, *The Communications Handbook*, (CRC Press 1997), incorporated herein by reference.

Time is divided in the DECT standard into frames of 10 ms. Individual frames are divided into twenty-four full slots. The standard also allows for slots of differing lengths including half slots of data (half the length of a full slot) and double slots of data (double the length of a full slot). Provision of different slot types within DECT allows use with different services having different data rates. For example, in DECT/ISDN applications, both full and double slots are utilized to provide ISDN service via a DECT network.

To provide support for multiple channels, a standard DECT base station compresses and transmits 10 ms of speech during one full slot. According to the DECT standard, 10 ms of speech is sent over the radio in 416 µs. Individual active connections make use of two slots, one for receiving and one for transmitting. For example, if plural slots in a DECT frame are numbered from zero to twenty-three, the first twelve slots (0–11) are used for transmission from the base station to the handset and the remaining slots are used for handset to base station transmissions. A base station transmitting to a given handset in slot N receives from this handset in slot N plus twelve, or in other words, half a frame later. Accordingly, a DECT base station operating in accordance with the standard is able to support up to twelve active voice connections simultaneously.

The total number of bits within a conventional DECT slot is 480. With twenty-four slots and a 10 ms frame, a gross bit rate of 1.152 Mbits/second is provided. Once the DECT slot has been formatted, it is transmitted using one of ten radio frequencies specified within the DECT standard. For example, the frequency band assigned to DECT in Europe is between 1,880 and 1,900 MHz, with a spacing of 1.728 kHz between adjacent frequencies. The transmission frequency for each channel is chosen dynamically based upon a Radio Signal Strength Indication (RSSI). Individual active slots in a DECT frame may be transmitted and received on any of the ten frequencies.

Enabling communication of slots having a plurality of lengths increases the flexibility and applications of the communication system. The present invention enables communication of slots having different lengths while alleviating timing problems associated with such communications.

BRIEF DESCRIPTION OF THE DRAWINGS

Preferred embodiments of the invention are described below with reference to the following accompanying drawings.

FIG. 8 is a timing diagram illustrating communication of slots and corresponding frequencies.

FIG. 9 is a timing diagram illustrating communications within a conventional DECT system.

FIG. 10 is a timing diagram similar to FIG. 9 illustrating timings within another DECT communication system.

FIG. 17 is a timing diagram illustrating slots and associated slot information of one system according to the present invention.

FIG. 18 is a flow diagram of a conventional DECT communication system.

DETAILED DESCRIPTION OF THE PREFERRED EMBODIMENTS

Figure 1:
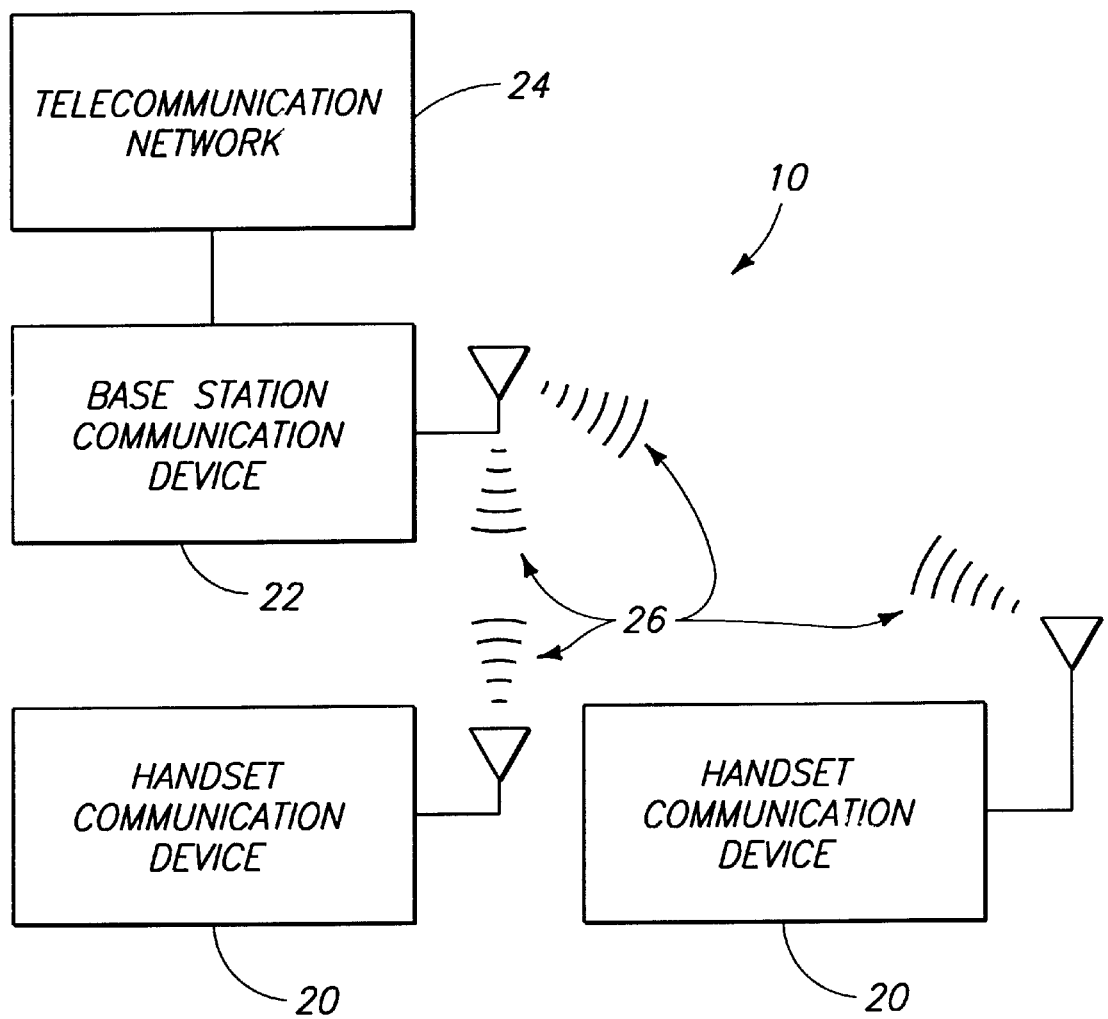
FIG. 1 is a functional block diagram of a communication system.

This disclosure of the invention is submitted in furtherance of the constitutional purposes of the U.S. Patent Laws "to promote the progress of science and useful arts" (Article 1, Section 8).

One embodiment of the present invention provides a communication system comprising: a radio having a synthesizer operable to generate a carrier signal responsive to frequency data, the radio being configured to communicate a plurality of slots using the carrier signal; a control processor configured to generate control information regarding the slots; and a data processor coupled with the radio and the control processor, the data processor being configured to use the control information to identify a first slot and a subsequent slot responsive to the identification of the first slot, the data processor being further configured to control the output of frequency data to the radio responsive to the identification of the first slot and the second slot.

A second aspect of the present invention provides a communication method comprising: providing a carrier signal having a frequency; communicating a plurality of slots including a first slot and a subsequent slot using the carrier signal; identifying the first slot; identifying the subsequent slot responsive to the identifying the first slot; outputting frequency data responsive to the identifying the subsequent slot; and changing the frequency of the carrier signal responsive to the outputted frequency data.

Another aspect of the present invention provides a communication method comprising: communicating a plurality of slots including a first slot and a subsequent slot; identifying the first slot; identifying the subsequent slot responsive to the identifying the first slot; outputting frequency data regarding the subsequent slot responsive to the identifyings; and communicating the first slot following the outputting.

According to another aspect, the invention provides a communication method comprising: providing data in a plurality of slots; generating a carrier signal using a synthesizer; communicating slot data of the slots using the carrier signal; generating frequency data corresponding to the slots; outputting frequency data to the synthesizer intermediate communication of slot data of adjacent slots; changing the frequency of the carrier signal responsive to the outputting of the frequency data; and varying the timing of the outputting of the frequency data.

Another communication method of the present invention comprises: providing a plurality of slots having different lengths; providing a plurality of slot control blocks having slot communication information; and communicating the slots using slot communication information of respective slot control blocks.

Yet another aspect of the invention provides a method of communicating data within a DECT communication system comprising: forming a first DECT slot and a subsequent DECT slot; generating first frequency data corresponding to the first DECT slot and second frequency data corresponding to the subsequent slot; identifying the length of the first DECT slot; identifying the subsequent slot; outputting the first frequency data to a synthesizer; loading the synthesizer with the first frequency data; settling the synthesizer at the first frequency following the loading the synthesizer with the first frequency data; generating a carrier signal having the first frequency; communicating the first slot using the first frequency carrier signal; outputting the second frequency data to the synthesizer responsive to identifying the subsequent slot as an active slot, the outputting occurring prior to the communicating the first slot; loading the synthesizer with the second frequency data; adjusting the synthesizer according to the second frequency data; settling the synthesizer at the second frequency following the loading the synthesizer with the second frequency data; generating a carrier signal having the second frequency; communicating the subsequent slot using the second frequency carrier signal; and varying the timing of one of the outputtings responsive to identifying the first and second DECT slots.

The present invention is not limited to DECT configurations although it is described with reference to the DECT standard. The present invention is also applicable to cordless communication systems which utilize other communication protocols or standards.

Referring to FIG. 1, a communication system 10 is shown. Communication system 10 comprises a DECT communication system in the disclosed embodiments. DECT communication system 10 generally comprises a plurality of communication devices 20, 22. The illustrated communication devices include portable handset communication devices 20 and at least one fixed base station communication device 22. Fixed base station communication device 22 is adapted to couple with a telecommunications network 24 in the described embodiment. Exemplary telecommunications networks 24 include an Integrated Services Digital Network (ISDN) and Public Switched Telephone Network (PSTN).

Communication devices 20, 22 are individually configured to receive and/or generate a data signal or data stream, and communicate the data signal. Communication of the data signal includes transmitting and receiving data via a wireless medium 26. An exemplary wireless medium includes utilization of radio frequency energy although other wireless communications are possible.

Communication devices 20, 22 are operable to manipulate the data signal or stream into a plurality of slots in accordance with the communication protocol or standard (e.g., DECT) being utilized. Portions of the data stream are provided into respective slots. Communication devices 20, 22 are configured to transmit data within the slots in accordance with a predefined frame structure. The definition of slot herein is intended to cover any data, control or other information packet.

Figure 2:
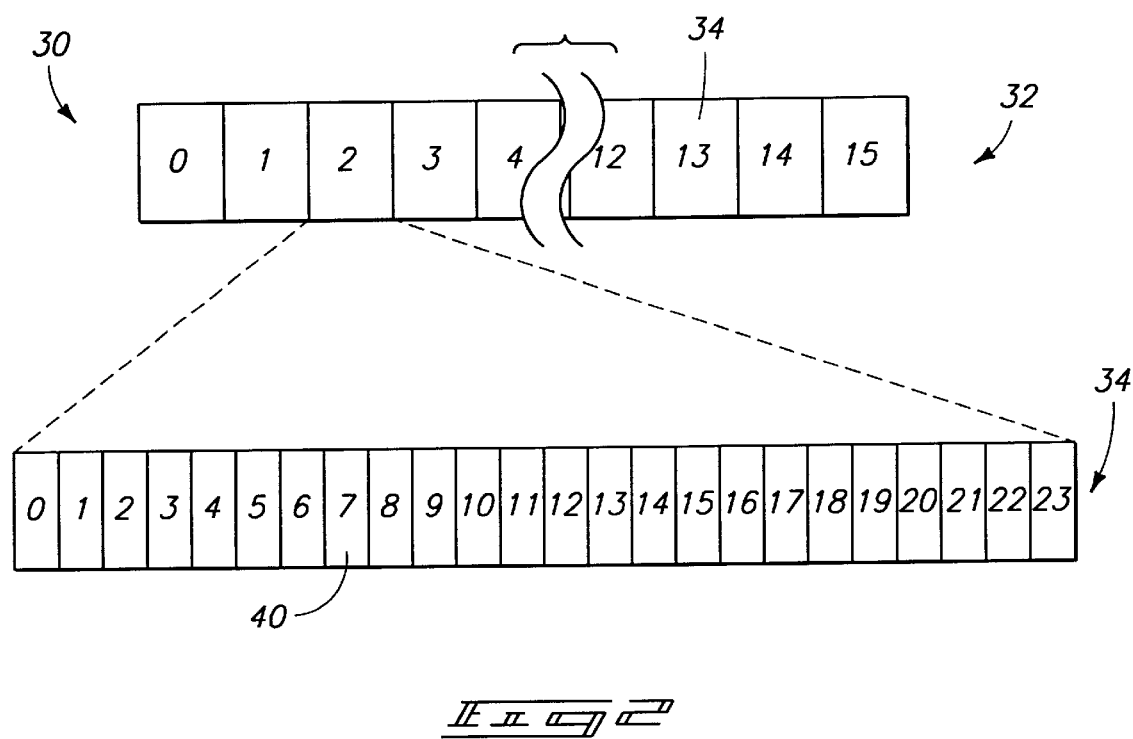
FIG. 2 is an illustrative representation of a DECT frame structure.

Referring to FIG. 2, one exemplary frame structure 30 includes a time division multiple access (TDMA) structure. The TDMA method enables n communication devices to access an assigned bandwidth W on a time basis. The individual communication devices access the full bandwidth but for only a fraction of the time on a periodic basis. One communication device is given a slot in a frame having n slots for communicating its respective data.

Frame structure 30 shown in FIG. 2 comprises a DECT multiframe 32 which includes a plurality of individual DECT frames 34. In accordance with the DECT standard, an individual multiframe 32 comprises sixteen DECT frames 34. An individual DECT frame 34 comprises a plurality of slots 40. In particular, a DECT TDMA frame 34 comprises twenty-four slots 40.

Figure 3:
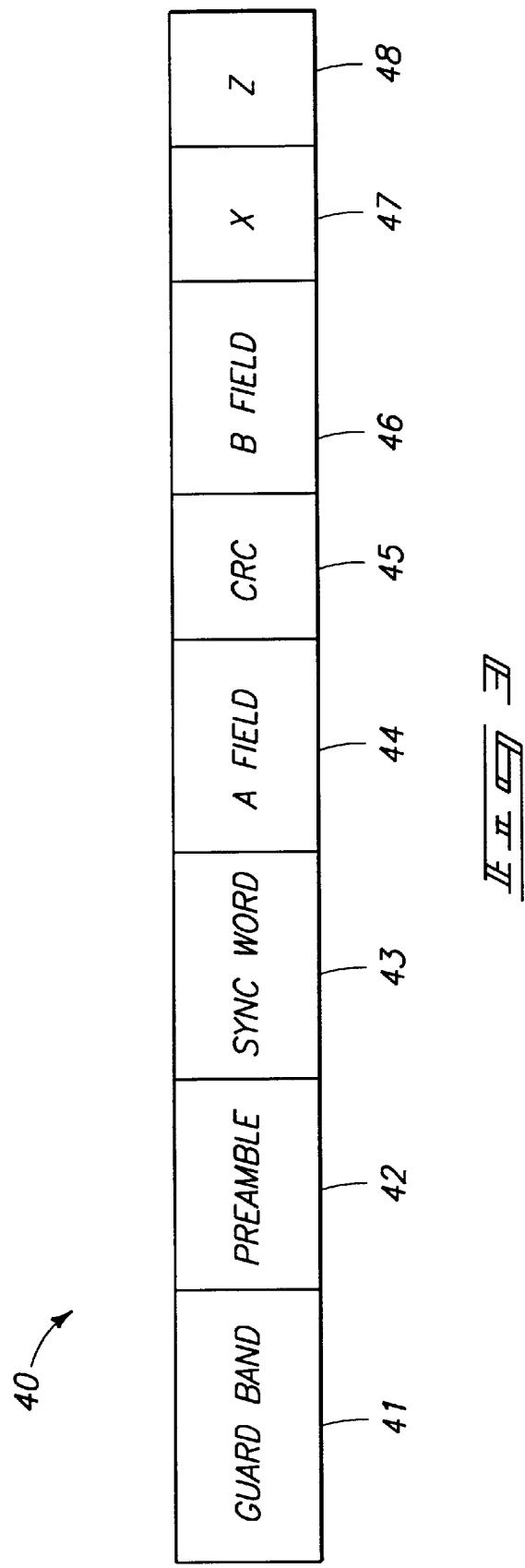
FIG. 3 is an illustrative representation of a DECT slot.

Referring to FIG. 3, an exemplary DECT slot 40 is shown. DECT slot 40 includes a plurality of predefined fields. The depicted fields include a guard band 41, preamble 42, synchronization (sync) word 43, A field 44, CRC field 45, B field 46, X field 47 and Z field 48.

Guard band 41 consists of fifty-six bits and is provided for frequency switching and delay handling between adjacent slots. Such delay handling may be caused by excessive distances intermediate communication stations 20, 22 resulting in delaying of received slots with regard to DECT frame timing. Providing frequency switching enables communication of different slots at different frequencies.

The first transmitted bits belong to a synchronization field which includes preamble 42 of sixteen bits and synchronization word 43 of sixteen bits. These bits are used by communication devices 20 during receive operations for synchronization to timing of communication station 22. Additionally, preamble 42 and synchronization word 43 are utilized by communication station 22 to detect the beginning of a transmission via one of communication stations 20. Typically, communication stations 20, 22 have different preambles 42 and synchronization words 43.

A field 44 comprises sixty-four bits and is transmitted after synchronization word 14. A field 44 contains DECT protocol messages exchanged between communication stations 20, 22 as well as information regarding the content of B field 46 which follows. A first cyclic redundancy check (CRC) field 45 of sixteen bits is provided intermediate A field 44 and B field 46. B field 46 is typically 320 bits corresponding to 80 4-bit Adaptive Differential Pulse Code Modulation (ADPCM) samples. B field 46 contains real voice data (10 ms of speech) in the described embodiments. X field 47 of four bits and Z field 48 of four bits are provided to X field 47 of four bits is provided to carry a 4-bit cyclic redundancy Check (CRC) over the B-field for error detection. The four bits of the Z field 48 are a copy of the four bits of the X field and are provided for detection of a sliding interferer from the back by comparing the X field four bits and the Z field four bits.

Exemplary DECT communications are described in U.S. patent application Ser. No. 08/805,279, now U.S. Pat. No. 6,212,205B1entitled "Methods of Generating a Data Stream, Methods of Validating an Integrated Circuit, and Methods of Communicating a Data Stream", filed Feb. 25, 1997, naming Michel Eftimakis as inventor, assigned to the assignee hereof, and incorporated herein by reference.

Figure 4:
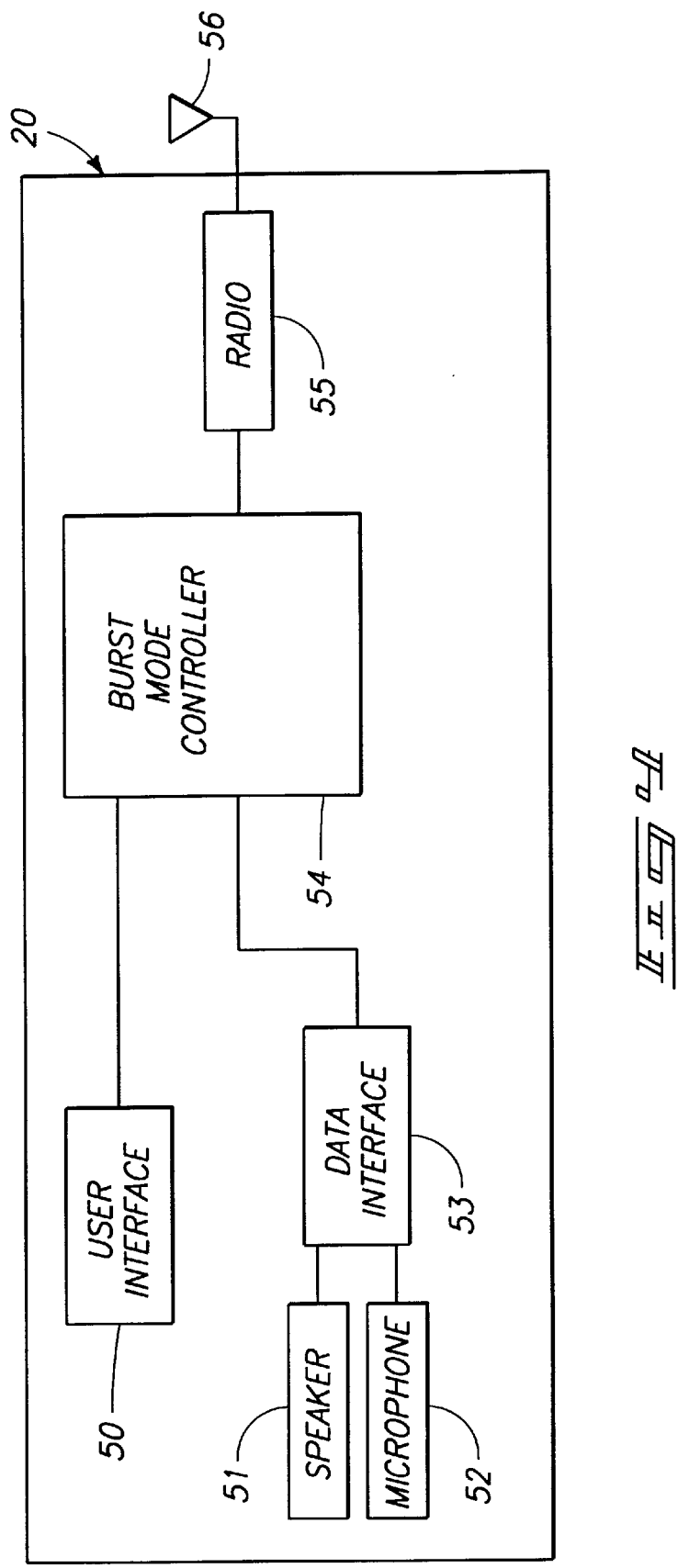
FIG. 4 is a functional block diagram of a communication device of the communication system of FIG. 1.

Referring to FIG. 4, communications in accordance with the present invention are described herein with reference to an individual handset or portable communication station 20. The described communication operations are also applicable to base station 22. The embodiment of portable handset radio communication device 20 depicted in FIG. 4 includes a plurality of components including a user interface 50, speaker 51, microphone 52, data interface 53, burst mode controller (BMC) 54, radio 55, and antenna 56.

Base station communication device 22 (not shown in FIG. 4) additionally includes a line interface which is operable to provide a data connection with telecommunications network 24.

Data interface 53 of portable handset station 20 provides connections to microphone 51 and speaker 52. Microphone 51 and speaker 52 respectively operate to convert audible sounds into electrical signals and vice versa. The electric signals produced within microphone 51 are applied to data interface 53, burst mode controller 54, radio 55 and antenna 56. A data signal received via antenna 56 is applied in reverse order to radio 55, burst mode controller 54, data interface 53 and speaker 51 for conversion to audio signals.

User interface 50 comprises a keypad in one embodiment operable to receive user input instructions for controlling operations of handset 20. The user interface 24 may additionally include a display, such as a liquid crystal display (LCD), enabling a user to monitor the operation of handset 20.

Burst mode controller 54 is provided intermediate data interface 53 and radio 55 within communication device 20. Burst mode controller 54 contains baseband architecture of communication device 20. Individual communication devices 20, 22 include a respective burst mode controller 54 configured to provide data manipulation operations.

During transmit operations, burst mode controller 54 is operable to access the data signal from data interface 53 at appropriate times within the TDMA frame. Burst mode controller 54 is configured to output data in slots to radio 55 in compliance with the DECT standard. Transmit slots are applied to radio 55 and transmitted using radio frequency signals in the preferred embodiment. During receive operations, burst mode controller 54 is operable to convert received slots from radio 55 into a continuous data signal for application to data interface 53.

Figure 5:
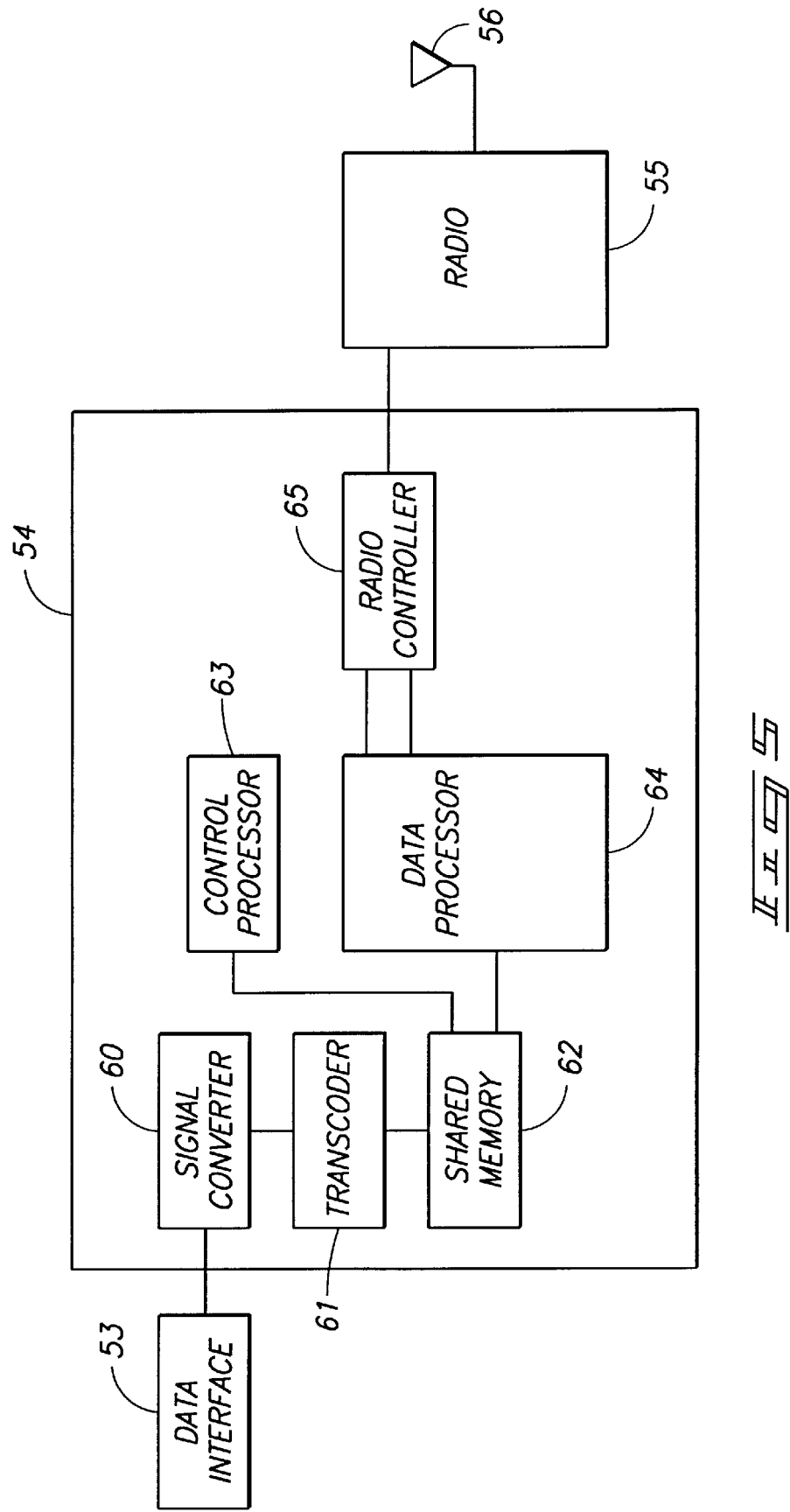
FIG. 5 is a functional block diagram illustrating internal components of the communication device of FIG. 4.

Referring to FIG. 5, an exemplary burst mode controller 54 is illustrated. The depicted burst mode controller 54 includes a signal converter 60, transcoder 61, shared memory 62, control processor 63, data processor 64, and radio controller 65. In a preferred embodiment, burst mode controller 54, including data processor 64, comprises integrated circuitry. Data processor 64 is coupled with control processor 63 via shared memory 62 and with radio 55 via radio controller 55.

Signal converter 60 of burst mode controller 54 is operable to provide analog to digital, and digital to analog conversion operations. For transmission communications, signal converter 60 is configured to sample the voice or other analog data signal at 8 kHz to provide sufficient voice quality in accordance with the Nyquist rate.

The sampled signal is converted into a 64 kbit/s digital signal in two steps in the described embodiment. Initially, the analog signal is converted into a 14 bit linear Pulse Code Modulated (PCM) signal. Second, the linear PCM signal is compounded into an 8 bit signal wherein the sample is quantified using a logarithmic scale thereby minimizing the quantifying error at small amplitudes. A preferred signal converter 60 implements the standards described in the International Telegraph and Telephone Consultative Committee (CCITT) Blue Book G711 recommendation.

Inasmuch as frequency bands assigned to DECT cordless systems are generally relatively narrow, transcoder 61 is provided in the preferred embodiment to minimize the bit stream rate in order to achieve desired traffic density figures. Transcoder 61 preferably comprises an Adaptive Differential PCM transcoder. During the encoding phase, transcoder 61 compares the 8 kHz signal provided by the signal converter 60 with an estimate of the same signal calculated by transcoder 61 from previously received samples. A 4 bit coded word having the same frequency as the input contains the difference between the input signal and the estimated signal. The data rate of the ADPCM samples is 32 kbit/s. A preferred transcoder 61 is specified by the International Telegraph and Telephone Consultative Committee (CCITT) Blue Book G726 recommendation. Following processing within transcoder 61, the input transmit data signal is stored within the shared memory 62.

Data processor 64 is configured to provide data manipulation of both the transmit data signal and receive data signal. In one embodiment, data processor 64 comprises a physical layer processor (PLP). An exemplary physical layer processor is disclosed in U.S. patent application Ser. No. 08/661,606, entitled "Asynchoronouse Timing Genorator in DECT Base Band Products", filed Jun. 11, 1996, naming Michel Eftimakis and Gianmaria Mazzucchelli as inventors, assigned to the assignee hereof, and incorporated herein by reference.

The described data processor 64 provides data frame construction of the transmit data signals for utilization within the DECT protocol. Data processor 64 retrieves the data signal to be transmitted from shared memory 62 and transforms the transmit data signal into a plurality of DECT slots. Data processor 64 interfaces via radio controller 65 with radio 55 and applies the transmit DECT slots to radio 55 for transmission by radio frequency signal.

In a receive mode of operation, radio 55 of respective communication devices 20, 22 receives transmitted radio frequency signals and performs demodulation operations to recover a baseband data stream. The received data stream, in the form DECT slots, is applied to burst mode controller 54 wherein data is extracted from the DECT slots. Data processor 64 stores ADPCM 4-bit samples within shared memory 62.

For communications within a handset communication device 20, transcoder 61 and signal converter 60 retrieve the data samples from shared memory 62 and convert the samples into a 8 kHz data signal for application to data interface 53. The analog output signal is applied to audio speaker 51 in the described embodiment. For communications within base station communication device 22, the received data signal may be retained in digital format and applied to a line interface for transmission to a telecommunications network.

Control processor 63, also referred to as a host processor, is coupled with memory 62 and configured to execute software which implements the DECT protocol. Control processor 63 is configured to interface with memory devices (not shown) which store codes and information for encryption and radio control code utilized to initialize radio controller 65 and implement the DECT protocol.

In the described embodiment, control processor 63 generates slot control blocks which contain control information or signals utilized for performing desired communication device operations including data signal manipulation operations. For example, slot control blocks identify upcoming slots and portions of the data stream are placed in appropriate slots for transmission. Slot control blocks also provide information for receive operations wherein data is extracted from received slots and converted to a continuous data stream. Slot control blocks include control information which can comprise information to identify transmit or receive slots, active or inactive slots, and appropriate communication frequency data for communication of the slots. Active control blocks generally include information defining the slot and desired carrier signal frequency for communicating the slot. Control processor 63 stores slot control blocks in dedicated locations of shared memory 62 in the described embodiment.

Interfacing of burst mode controller 54 and radio 55 of communication devices 20, 22 are discussed in detail below. Radio 55 is coupled with antenna 56 which is operable to receive and transmit radio frequency signals. Spatial antenna diversity may be provided at base station 22 to improve the reception of radio frequency signals. Providing antenna diversity is preferred in order to reduce fading and interference.

Radio controller 65 controls the operation of radio 55 in accordance with radio control code. Radio controller 65 operates on DECT bit timing where, at certain DECT bit times, radio control signals are asserted or de-asserted in the exemplary embodiment of the invention.

Figure 6:
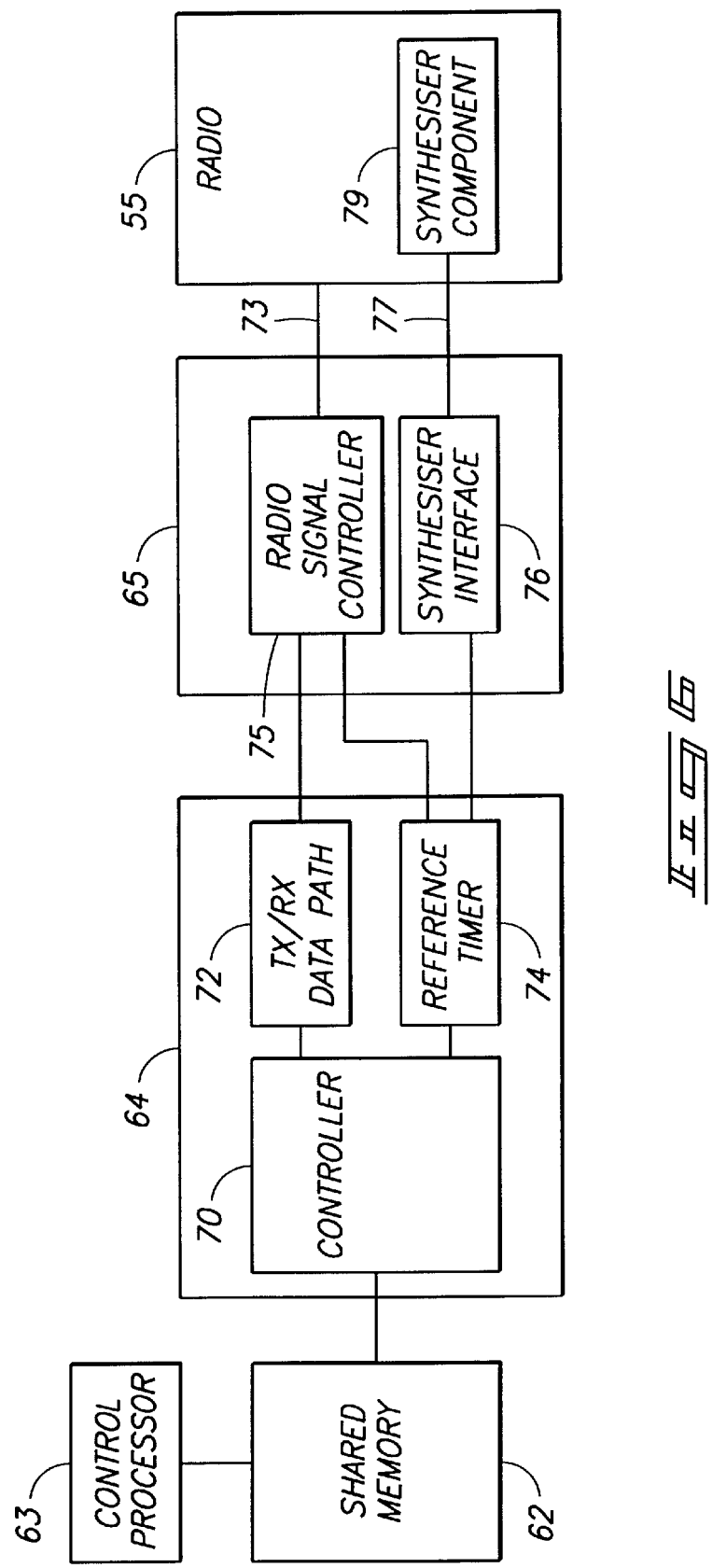
FIG. 6 is a functional block diagram illustrating internal components of components shown in FIG. 5.

Referring to FIG. 6, control processor 63, shared memory 62, data processor 64, radio controller 65, and radio 55 are illustrated in detail. The illustrated data processor 64 comprises a controller 70, TX-RX data path 72 and reference timer 74. The illustrated radio controller 65 comprises a radio signal controller 75 and synthesizer interface 76. The depicted radio 55 comprises a synthesizer component 79. In the described embodiments, component 79 comprises plural slow-settling synthesizers configured to generate carrier signals for radio frequency communications, or a fast-settling synthesizer configured to generate the carrier signals.

Controller 70 is coupled with shared memory 62, TX-RX data path 72 and reference timer 74. Reference timer 74 is coupled with radio signal controller 75 and synthesizer interface 76. Controller 70 comprises a direct memory access controller in the depicted embodiment and is configured to fetch slot control blocks including control information from shared memory 62. In addition, controller 70 is configured to transfer data intermediate shared memory 62 and TX-RX data path 72.

Reference timer 74 is configured to implement time division multiple access (TDMA) frame timing responsive to control information fetched from shared memory 62. In one embodiment, reference timer 74 is configured to generate a timing signal, referred to as a bit number (BNO). The bit number is applied to radio signal controller 65 and corresponds to DECT bit timing. TX/RX data path 72 comprises a multiple access processor in one embodiment configured to provide conversion operations of a data signal to a plurality of slots. The multiple access processor is configured to provide the conversion operations according to the DECT standard in the described embodiment. In one embodiment, data path 72 converts slots into a continuous data signal, and vice versa.

Radio controller 65 interfaces with TX/RX data path 72 and reference timer 74. Radio controller 65 implements control operations according to one embodiment as set forth in U.S. patent application Ser. No. 08/808,548, entitled "Radio Signal Controller, Radio Communication Device, Radio Communication System and Methods of Controlling a Radio", filed Feb. 28, 1997, naming Roland van der Tuijn and Michael Staplehurst as inventors, assigned to the assignee hereof, and incorporated herein by reference. Radio signal controller 75 communicates control signals and data with radio 55 via interface connection 73.

Synthesizer interface 76 of radio controller 65 is configured to control the frequency of communications of radio 55. In particular, synthesizer component 79 includes one or more synthesizers configured to generate a carrier signal at a selected frequency. In DECT communications, communication stations 20, 22 are configured to communicate within the frequency band assigned in Europe between 1,880 and 1,900 MHz. A spacing of 1.728 kHz is specified in DECT between adjacent frequencies.

In DECT, the frequency of the carrier signal being utilized for communication intermediate communication stations 20, 22 can change from one slot to another. Control or host processor 63 controls the frequency of the carrier signal utilized for communication responsive to a RSSI indication. Control processor 63 indicates the appropriate frequency via control signals or information with in slot control blocks. The control signals control the transmit and receive frequencies of radio 55. In a DECT application utilizing 10 carrier frequencies, 10 TX synthesizer values and 10 RX synthesizer values may be used.

Reference timer 74 retrieves and receives slot control blocks from shared memory 62. The slot control blocks contain frequency data which specify the frequency for communication. Reference timer 74 applies the frequency data to synthesizer interface 76. Interface 76 converts the received frequency data from the slot control blocks into a synthesizer word. The synthesizer word includes control bits for operating the synthesizers of component 79 as well as frequency data for changing the frequency of the carrier signals generated within radio synthesizer component 79. At the appropriate time, the synthesizer word is shipped to a register within synthesizer component 79 via interface connection 77. Responsive to control signals from reference timer 74, the frequency data is loaded into the appropriate synthesizer.

Figure 7:
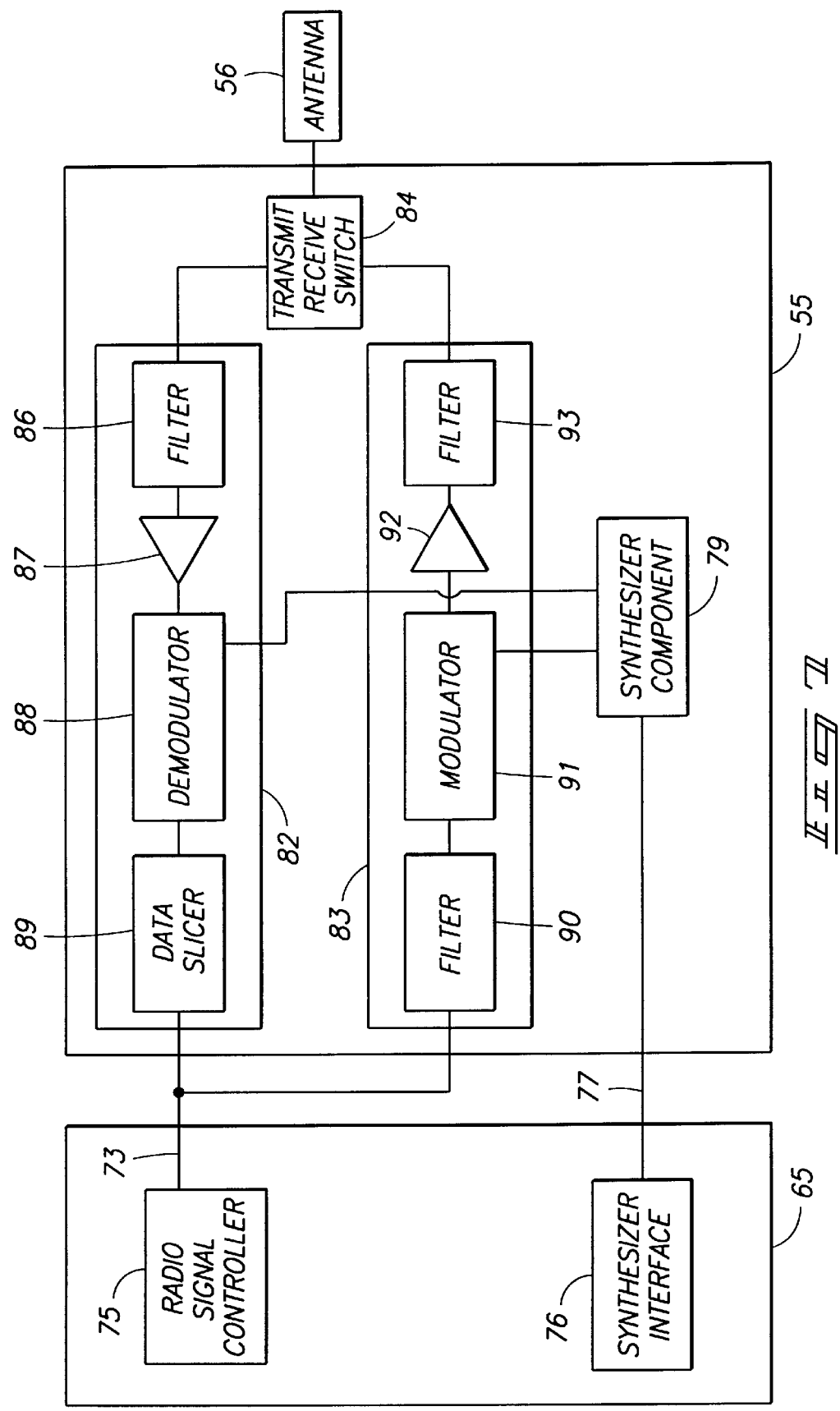
FIG. 7 is a functional block diagram of a radio of a communication device.

Referring to FIG. 7, synthesizer interface 76 is coupled via interface connection 77 to synthesizer component 79 within radio 55. The preferred embodiment of synthesizer interface 76 enables programming of different types of synthesizers within synthesizer component 79 through the utilization of a three wire interface 77. It is desired to only provide programming of the synthesizers of component 79 intermediate communication of slot data of adjacent slots as described in detail below.

Synthesizer component 79 within radio 55 may include an IF (intermediate frequency) synthesizer and a RF (radio frequency) synthesizer or two RF synthesizers if slow-settling synthesizers are utilized. Providing two synthesizers within component 79 permits one synthesizer to change or adjust its output frequency while the second synthesizer is utilized to communicate RF signals. Once the current slot has been transmitted or received, the second synthesizer may be utilized to control the frequency of transmission or reception of the next DECT slot.

More specifically, plural radio synthesizers 79 are utilized to permit the use of one synthesizer while the frequency of the other is changed responsive to an indication within a slot control block that the frequency of the carrier signal utilized to communicate a subsequent slot will be different. One fast-settling radio synthesizer can be provided within synthesizer component 79 if the settling time of the synthesizer is appropriately fast to change and settle intermediate adjacent slots (i.e., within the guard band of a slot). Suitable slow synthesizers include a LMX2320 or LMX2325 PLLatinum™ frequency synthesizer available from National Semiconductor Corporation, a MB1505 available from Fujitsu Ltd., or a SA8025 2G low-voltage fractional-N synthesizer available from Philips Electronics N.V. A suitable fast synthesizer includes a URSE7 available from Alps Electric, Co.

The depicted radio 55 comprises a receiver 82, transmitter 83, transmit/receive switch 84, and synthesizer component 79. Receiver 82 and transmitter 83 are individually configured in the described embodiments to provide radio frequency communications. As utilized herein, communications refer to transmit and receive operations within one of communication stations 20, 22. Transmit/receive switch 84 is provided to selectively connect one of receiver 82 and transmitter 83 with antenna 56. Control processor 63 and radio signal controller 75 are configured to operate transmit/receive switch 84 using a radio control word.

With reference to the receiving mode of operation, RF signals received via antenna 56 are applied to transmit/receive switch 84 and directed to receiver 82. A preferred embodiment of receiver 82 includes a receive band-pass filter 86, amplifier 87, demodulator 88, and data slicer 89. Desired RF signals initially pass through band-pass filter 86 and are amplified within amplifier 87. The output of amplifier 87 is applied to demodulator 88 which recovers the baseband signal of the received RF signal. The synthesizer component 79 applies the appropriate frequency to demodulator 88 to extract the baseband signal.

The output of demodulator 88 is applied to data slicer 89 which performs analog to digital conversion operations. Data slicer 89 extracts the slice level during the preamble and synchronization word of received DECT slots. Output from the data slicer 89 is applied to radio controller 65 and data processor 64 via interface 73.

During transmission modes of operation, data processor 64 and radio controller 65 apply formatted DECT data slots to transmitter 83 via interface 73. The preferred embodiment of transmitter 83 includes a transmit data filter 90, modulator 91, transmit amplifier 92 and transmit band-pass filter 93.

The data signal is first applied to transmit data filter 90 which performs digital to analog conversion operations. The data signal is thereafter applied to modulator 91 which generates the RF transmit signal using the carrier signal. Modulator 91 receives the carrier signal having the appropriate communications frequency from synthesizer component 76. Modulator 91 preferably utilizes Gaussian Minimum Shift Keying (GMSK) modulation in compliance with the DECT standard. GMSK modulation provides a resultant waveform which exhibits phase continuity providing reduced sensitivity to intersymbol interference.

Following modulation, the RF transmit signal is amplified by transmit amplifier 92 and applied to transmit band-pass filter 93. The output of transmitter 83 is applied to transmit/receive switch 84 which directs the RF transmit signal to antenna 56.

Referring to FIG. 8, a timing diagram of communication operations of one embodiment of radio 55 is described. In the described time division multiple access (TDMA) system, individual slots within a TDMA frame can be operated or communicated at different RF frequencies.

Plural lines 110, 112 illustrated in FIG. 8 are related in time. Time increases from left to right in FIG. 8. Line 110 indicates a time division multiple access frame structure. Line 110 includes plural slot data portions 114, 115, 116 of a sequence of slots. Line 112 indicates RF frequency of a carrier signal for communication operations of radio 55. Line 112 also indicates changing of frequency of the carrier signal utilized for RF communications by radio 55 responsive to control information from control processor 63.

As described above, guard bands 113 are defined between adjacent slot data 114, 115, 116 of respective slots. Guard bands 113 enable the frequency of the carrier signal of radio 55 to be switched between intermediate communications of such slot data 114, 115, 116.

Prior to communication of slot data 114, radio 55 is configured to communicate via frequency A 117 during a first guard band 113. Following communication comprising one of transmission or reception of slot data 114, radio 55 is configured to communicate via frequency B 118 during the next guard band 113 intermediate slot data 114, 115. Following communication of slot data 115, radio 55 is configured to communicate via frequency C 119 during the guard band 113 intermediate slot data 115, 116. The carrier signal frequency can be changed again following communication of slot data 116.

As illustrated, communication system 10 is configured to change communication frequency of the carrier signal between communicated slot data. Alternatively, radio 55 can communicate a plurality of sequential slots and slot data using a carrier signal having one frequency.

As previously mentioned, synthesizer component 79 of radio 55 can comprise slow-settling synthesizers or fast-settling synthesizers in the described embodiments. Slow-settling synthesizers typically require a RF frequency-settling time longer than a guard band provided intermediate adjacent slot data. On the other hand, fast-settling synthesizers typically provide RF frequency settling within the guard band between adjacent slot data.

Referring to FIG. 9, a timing diagram illustrating the timing of communication operations within a radio utilizing slow-settling synthesizers is illustrated. In particular, programming and operation of synthesizers of component 79 of radio 55 are illustrated.

A plurality of lines 120–125 are illustrated with reference to time. Time is illustrated sequentially for plural sequential slots: slot N−1, slot N, slot N+1, and slot N+2. Time in FIG. 9 increases from left to right. The described slots N−1, N, N+1 and N+2 correspond to timing and communication for a full slot. As illustrated below, slots of other lengths can be communicated and such slots can utilize more or less time than that depicted for individual slots N−1, N, N+1 and N+2. For example, a double slot utilizes timing for two slots and a half slot utilizes half a slot timing.

Line 120 indicates a time division multiple access (TDMA) frame structure. Line 120 represents communication of slot data (e.g., voice data) 127–130 for respective slots N−1, N, N+1 and N+2. Line 121 of FIG. 9 illustrates synthesizer data, also referred to as frequency data, 131–134 clocked into synthesizer component 79 and which specifies the frequency for communication of corresponding slots. More specifically, frequency data 131, 132, 133, 134 correspond to subsequent slots N, N+1, N+2, N+3 (slot N+3 is not shown in FIG. 9). Line 121 represents application of frequency data from synthesizer interface 76 to internal registers of component 79 (illustrated in FIG. 6).

Lines 122, 123 correspond to loading of frequency data from registers within synthesizer component 79 into the first and second slow-settling synthesizers. The synthesizers of component 79 change the frequency of an output carrier signal responsive to receiving changed frequency data from synthesizer interface 76. Lines 122, 123 illustrate pulses 135–138 which control the timing of loading of frequency or synthesizer data 131–134 from the registers of synthesizer component 79 into the synthesizers. Pulses or enable signals 135–138 are asserted by data processor 64 in the depicted embodiment.

At some point prior to outputting of frequency data 131–134 from interface 76 to component 79, the respective outputted frequency data 131–134 is retrieved from the slot control blocks of shared memory 62. Frequency data 131–134 is made available to synthesizer interface 76 for application to radio 55. Control processor 63 defines frequency data 131–134 corresponding to RSSI indications in one embodiment. It is possible that adjacent slots can be communicated utilizing a common frequency.

Lines 124, 125 correspond to frequency output of the first and second synthesizers, respectively. In particular, lines 124, 125 represent changing of frequencies of the respective first and second synthesizers of component 79. More specifically, slanted portions of lines 124, 125 represent settling of the corresponding synthesizer responsive to a frequency change specified by the frequency or synthesizer data. Horizontal portions of lines 124, 125 illustrate periods in time where the respective synthesizers are settled upon the appropriate frequency.

During slot N−1, the first synthesizer is loaded with frequency data 131 as illustrated by line 124 responsive to assertion of pulse 135. The first synthesizer settles upon the frequency specified by data 131 during slot N as also shown in line 124. As illustrated by line 125, the second synthesizer of component 79 is utilized to communicate slot data 127 during slot N−1 according to previously inputted frequency data (not shown in FIG. 9).

Pulse 135 loads frequency data 131 into the first synthesizer of synthesizer component 79. Responsive to pulse 135, the first synthesizer subsequently settles upon the specified frequency as illustrated by line 124. In the depicted diagrams, the illustrated frequency data is utilized for a subsequent slot. For example, frequency data 131 loaded during slot N−1 is utilized to communicate slot data 128 during slot N.

During slot N, the first synthesizer is used to communicate slot data 128 according to frequency data 131. Pulse 136 of line 123 loads frequency data 132 from internal registers of component 79 into the second synthesizer of component 79 for communication of slot data 129.

During slot N+1, the second synthesizer is used to communicate slot data 129 according to frequency data 132. Pulse 137 of line 122 loads frequency data 133 from internal registers of component 79 into the first synthesizer of component 79 for communication of slot data 130.

During slot N+2, the first synthesizer is used to communicate slot data 130 according to frequency data 133. Pulse 138 of line 123 loads frequency data 134 from internal registers of component 79 into the second synthesizer of component 79 for communication of slot data during slot N+3 (not shown in FIG. 9).

Referring to FIG. 10, communications utilizing a fast-settling synthesizer within a radio is described. With the use of fast-settling synthesizers, it is preferred to output frequency or synthesizer data from interface 76 to component 79 at the start of a previous slot to allow increased settling time during the guard band before an active slot is to be communicated. Such enables latching of the data from internal registers of component 79 into the synthesizer at the end of the previous slot as illustrated in FIG. 10.

The timing diagram of FIG. 10 includes a plurality of sequential slots N−1, N, N+1, and N+2. Time increases from left to right in FIG. 10. In addition, a plurality of lines 155–158 are illustrated with relation to time. Depicted line 155 indicates a time division multiple access (TDMA) frame structure including slot data portions 140–143 of respective slots.

Line 156 represents frequency data 145–148. Frequency data 145, 148 has been previously retrieved from shared memory 62. FIG. 10 illustrates the timing of applying or outputting frequency data 145–148 from synthesizer interface 76 to synthesizer component 79. Frequency data 145–148 individually correspond to subsequent slots as described in FIG. 9.

Line 157 indicates pulses or enable signals 149–152 provided for loading of frequency data received within registers of component 79 into the synthesizer of component 79. Enable signals 149–152 are generated by data processor 64 in the described embodiment.

Line 158 represents the state of the synthesizer of synthesizer component 79. The synthesizer is configured to settle upon the frequency specified by the appropriate frequency data 145–148 within a guard band of an individual slot.

During slot N−1 of FIG. 10, pulse 149 represented by line 157 loads previously retrieved frequency data from an internal register of synthesizer component 79 into the synthesizer thereof. The synthesizer of synthesizer component 79 settles upon the frequency prior to communication of slot data 140. Synthesizer data 145 is applied from synthesizer interface 76 to a register of synthesizer component 79 responsive to pulse 149 and prior to communication of slot data 140 during slot N−1.

During slot N, synthesizer load pulse 150 injected from data processor 64 loads frequency data 145 from an internal register of synthesizer component 79 into the synthesizer thereof. As shown by line 158, the synthesizer settles upon the specified frequency prior to communication of slot data 141 during slot N. Prior to communication of slot data 141, synthesizer data 146 is applied from synthesizer interface 76 into a register of synthesizer component 79.

During communication of slot N+1, synthesizer load pulse 151 loads frequency data 146 from a register of synthesizer component 79 into the synthesizer thereof. The synthesizer settles upon the frequency specified within frequency data 146 during slot N+1 as shown by line 158 and prior to communication of data 142. Synthesizer data 147 is applied from synthesizer interface 76 to a register within synthesizer component 79 before communication of slot data 142 during slot N+1. Slot data 142 is thereafter communicated.

Synthesizer load pulse 152 loads frequency data 147 from a register of synthesizer component 79 into the synthesizer thereof. As represented by line 158, the synthesizer of synthesizer component 79 settles upon the frequency specified by frequency data 147 prior to communication of slot data 143 within slot N+2. Synthesizer data 148 is applied from synthesizer interface 76 to synthesizer component 79 during the guard band of slot N+2 and prior to communication of slot data 143. Frequency data 148 may be utilized to communicate slots (not shown in FIG. 10) subsequent to slot N+2.

Communication system 10 can be configured to communicate slots of varying lengths. In an exemplary DECT embodiment, system 10 is configured to communicate half slots, full slots and double slots.

The start timing position of a current slot (e.g., slot N) may vary relative to the starting position of a previous slot (e.g., slot N−1) depending upon the slot type of the previous slot if different slot types are used within a time division multiple access (TDMA) frame. For example, if the previous slot is a full slot, then frequency data regarding the current slot should be sent from interface 76 to component 79 one full slot before the starting position or time of the current slot. If the previous slot is a double slot, then frequency data regarding the current slot should be sent one double slot before the starting position or time of the current slot.

Such is desired to avoid programming of a synthesizer within component 79 during communication of slot data using the particular synthesizer. The sending of synthesizer or frequency data during an active slot or communication of data is not desired in-as-much as switching activity upon programming lines of interface 77 may introduce RF frequency instability or offset the RF frequency. Instability or offsetting of the RF frequency can jeopardize RF performance of communication system 10.

Figure 11:
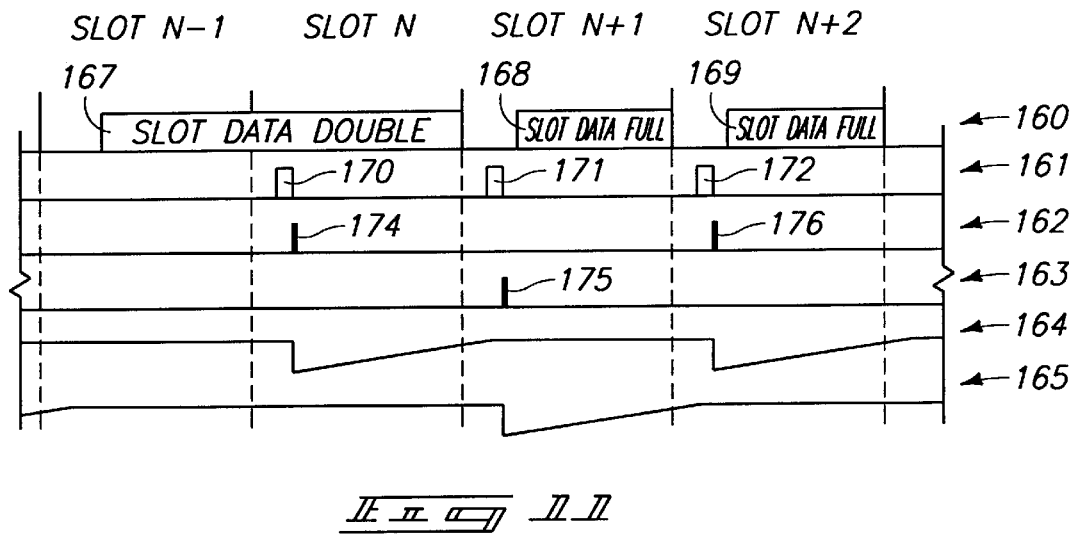
FIG. 11 is a timing diagram of a conventional DECT communication system communicating slots of different lengths.
Figure 12:
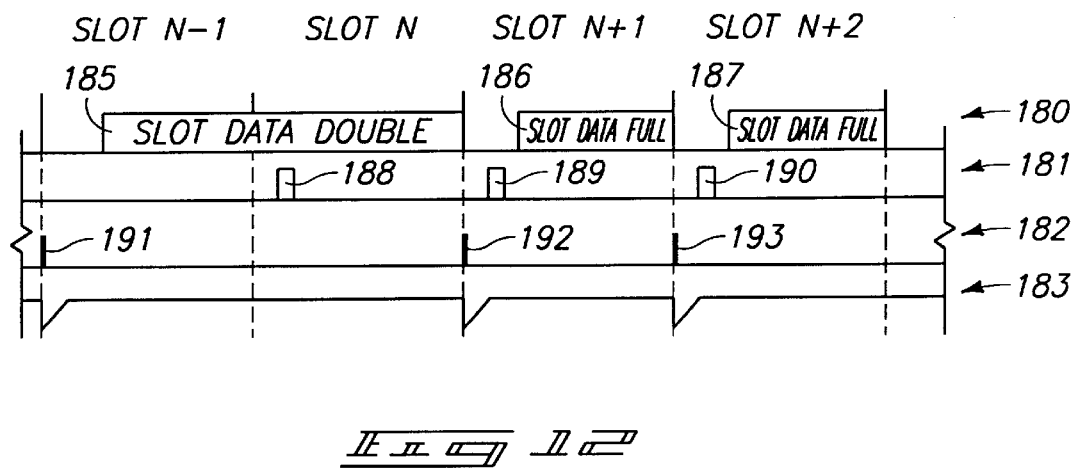
FIG. 12 is a timing diagram of another conventional DECT communication system communicating slots of different lengths.

Referring to FIGS. 11–12, a timing diagram is illustrated for a conventional communication system during communication of slots having a plurality of lengths (i.e., half, full, double). Such conventional systems provide programming of synthesizers at fixed times, or at a fixed slot type time in advance. This is referred to as providing programming for a fixed pipeline.

In such an arrangement, radio frequency information and slot information for a next slot is accessed at a fixed pipeline delay before the start of communication of the slot as previously described. Synthesizer and radio frequency data is applied to synthesizers based upon this information.

Referring to FIG. 11, a timing diagram is illustrated for a conventional communication system configured in accordance with the fixed pipeline delay arrangement and having slow-settling synthesizers within a synthesizer component. In such an embodiment, two synthesizers are implemented within the synthesizer component. A plurality of slots N−1, N, N+1, and N+2 are sequentially illustrated in time from left to right in FIG. 11.

The illustrated timing diagram includes a plurality of timing lines 160–165 including time division multiple access (TDMA) frame structure line 160, frequency data line 161, first synthesizer load line 162, second synthesizer load line 163, first synthesizer frequency line 164, and second synthesizer frequency line 165.

Slots having a plurality of lengths are illustrated in FIG. 11. Slot data 167 communicated during slot N−1 and slot N comprises slot data for a double slot. Respective slot data 168, 169 within slots N+1, N+2 comprise slot data for full slots.

Synthesizer or frequency data for a current slot is applied from synthesizer interface to the synthesizer component during the previous slot in the arrangement depicted in FIG. 11. For example, synthesizer data 170 corresponding to slot N+1 is applied to the synthesizer component during the previous slot (i.e., the double slot). Similarly, synthesizer data 171, 172 correspond to respective slots N+2 and N+3 (slot N+3 is not shown in FIG. 11).

Lines 162, 163 illustrate timing of enable signals 174–176 generated to control the loading of frequency data. Signal pulses 174–176 provide timing of loading of frequency data received within internal registers into desired first and second synthesizers of the synthesizer component. The first synthesizer is utilized to communicate slot data 168 as illustrated by line 164. The second synthesizer is utilized to communicate slot data 167 and slot data 169 as represented by line 165.

In the conventional configuration corresponding to FIG. 11, a fixed pipeline delay is set to one full slot. In such a configuration where a proceeding or previous slot (e.g., the slot within slot N−1, N) comprises a double slot, synthesizer data 170 for the subsequent full slot (slot N+1) is sent from the interface to the synthesizer component during communication of slot data 167 (i.e, a fixed time prior to slot N+1). Such is undesirable because RF frequency instability or offsetting of RF frequency may result jeopardizing RF performance of the communication system during communication of data or voice information of slot data 167.

Referring to FIG. 12, a timing diagram for communication of slots having different lengths within a conventional communication system is illustrated. Similar to the above, plural slots N−1, N, N+1, and N+2 are sequentially illustrated. The synthesizer component of the configuration corresponding to FIG. 12 includes a fast-settling synthesizer.

A plurality of timing lines 180–183 are illustrated in FIG. 12. The illustrated lines include a time division multiple access (TDMA) frame structure line 180 including slot data 185–187. Line 181 illustrates application of synthesizer data 188–190 from a synthesizer interface of the configuration to a synthesizer component. Line 182 represents loading of applied synthesizer data from a register within the synthesizer component into the fast-settling synthesizer responsive to enable signals 191–193. Line 183 illustrates the frequency or status of the carrier signal generated by the synthesizer of the synthesizer component. In particular, fast-settling operation of the synthesizer of the synthesizer component is illustrated by line 183.

Referring to timing line 180, slot data 185 comprises slot data for a double slot, and slot data 186, 187 correspond to slot data for full slots. Slot data 185 is communicated during slot N−1 and slot N. Slot data 186, 187 are communicated during respective slots N+1, N+2.

Referring to line 181, application of synthesizer data 188–190 from the synthesizer interface to the synthesizer component is described. Control signals 191, 192, 193 of line 182 control loading of synthesizer data corresponding to slot data within the synthesizer of the synthesizer component.

The frequency data corresponds to slot data of a subsequent slot in the configuration described with reference to FIG. 12. Synthesizer data utilized to specify the frequency of the carrier signal to communicate slot data 185 is loaded during slot N−2 (not illustrated in FIG. 12). Synthesizer data 188 corresponding to slot N+1 is applied from the synthesizer interface to the synthesizer component during slot N. Synthesizer data 189, 190 is applied during respective slots N+1, N+2 from the synthesizer interface to the synthesizer component prior to communication of slot data 186, 187 of the illustrated full slots.

As shown, frequency data 188 corresponding to slot N+1 is applied from the synthesizer interface to the synthesizer component during communication of slot data 185. As previously described, application of synthesizer data during communications may result in RF frequency instability or offsetting of the RF frequency generated by the synthesizer component.

Some conventional approaches have utilized software to control synthesizer programming in applications where mixed TDMA slots are communicated. In such conventional systems, synthesizer data is programmed in additional slot control blocks depending upon the length of the prior active slot. An additional slot control block is utilized for an individual slot in such systems resulting in software overhead and additional power consumption.

The present invention provides communication system 10 configured to communicate slots of different lengths. Communication system 10 is arranged to vary or adjust timing of outputting or application of frequency data from synthesizer interface 76 to synthesizer component 79.

The present invention utilizes current slot type information to access radio frequency and slot information for a subsequent slot. The subsequent slot comprises an adjacent subsequent slot in an exemplary embodiment. As illustrated in detail below, if a double slot is the current slot type, then frequency data and slot information for the next slot (one double slot later) is accessed and applied to synthesizer component 79 at the start of the double slot prior to communication of slot data of the double slot.

Referring again to FIG. 6, data processor 64 of the present invention is configured to use control information to identify a first slot using data from a slot control block which corresponds to the slot and generated using control processor 63. Data processor 64 is further configured to identify a subsequent slot responsive to the identifying of the first slot. In the described embodiment, data processor 64 is configured to apply or otherwise provide frequency data from interface 76 to synthesizer component 79 of radio 55 responsive to identification of the first and subsequent slots.

Data processor 64 is further configured to apply such frequency data intermediate interface 76 and component 79 during a guard band intermediate adjacent slots. In particular, frequency data retrieved from shared memory 62 is outputted from synthesizer interface 76 and applied to synthesizer component 79 during a guard band intermediate communication of slot data of adjacent slots. In the preferred embodiment, data processor 64 is configured to apply frequency data for a subsequent slot to synthesizer component 79 during a guard band of the slot prior to the subsequent slot.

Data processor 64 is operable to control varying of the timing of application of the frequency data intermediate interface 76 and component 79. In particular, data processor 64 can adjust or vary the timing of the application of the frequency data intermediate interface 76 and component 79 responsive to the identification of the first and second slots.

More specifically, data processor 64 extracts control information such as slot type (or length) information from corresponding slot control blocks generated by control processor 63. Data processor 64 identifies the length of the first slot using slot control block control information prior to communication of the first slot.

Data processor 64 initially identifies slots having differing lengths. Typically, a delay period for applying frequency data from interface 76 to component 79 is initially chosen corresponding to a given slot size (e.g., full slot). Data processor 64 determines if the first slot has a length different than the given slot size (e.g., a double slot following communication of plural full slots). Following such an identification, data processor 64 is configured to extract control information from a subsequent slot control block to identify the type of a next slot. Responsive to, and using the length of, the first identified slot, data processor 64 identifies a slot subsequent to the first identified slot.

Following identification of the subsequent slot, data processor 64 determines whether the slot is active. If the slot following the identified double slot is active, data processor 64 adjusts or varies the timing of the application of frequency data corresponding to the identified first slot and subsequent active slot. Data processor 64 is configured to vary the timing of application of frequency data to component 79 responsive to the first slot being a slot having a different length and the subsequent slot being an active slot.

As described below, data processor 64 is configured to control the application of frequency data corresponding to the subsequent slot (e.g., full slot) from interface 76 to synthesizer component 79 prior to communication of the current slot (e.g., identified double slot).

In some embodiments wherein plural slow-settling synthesizers are utilized, data processor 64 is configured to output frequency data corresponding to the subsequent slot to the one (e.g., first) synthesizer before communication of the previous slot using the other (e.g., second) synthesizer.

Figure 13:
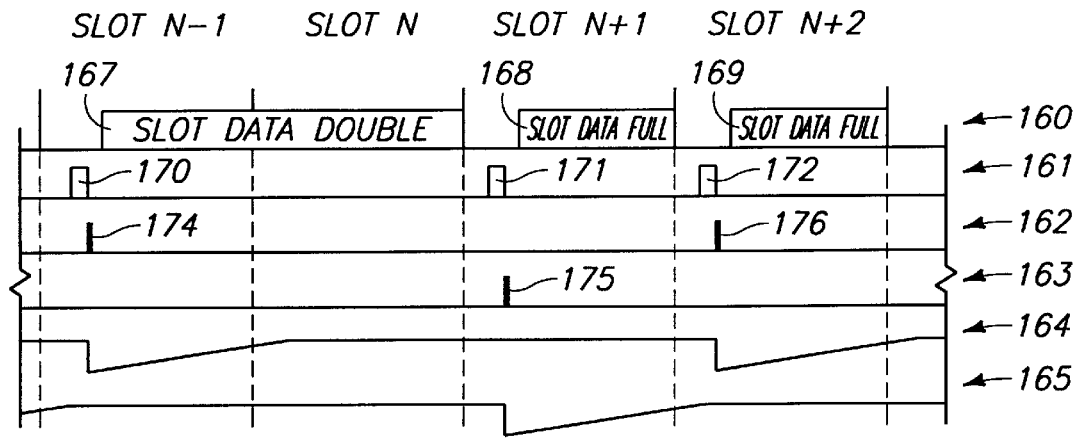
FIG. 13 is a timing diagram illustrating communication of slots of different lengths in accordance with the present invention.
Figure 14:
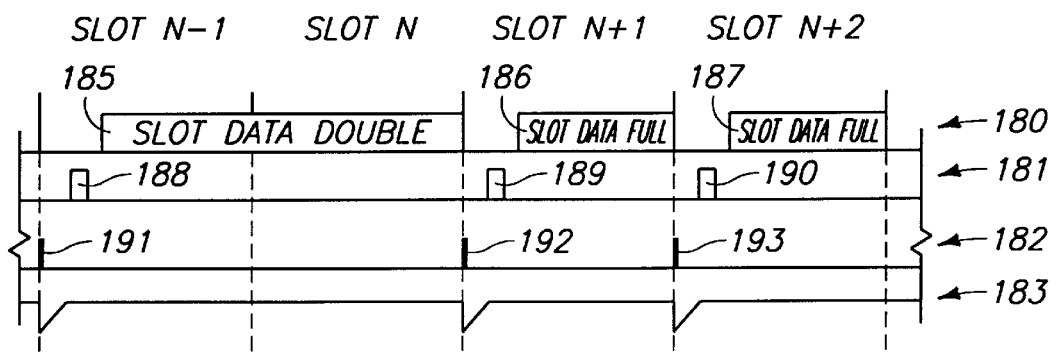
FIG. 14 is a timing diagram illustrating communication of slots of different lengths in accordance with another embodiment of the present invention.

Referring to FIGS. 13, 14, communication in accordance with the present invention is described with reference to a slow-settling synthesizer application and a fast-settling synthesizer application, respectively. The present invention utilizes current slot type information to access and output frequency data and slot information for the actual next slot. In the described embodiment, if current slot type is a double slot and a subsequent slot is active, then frequency data and slot information for the subsequent slot (one double slot later) is accessed and outputted or applied from interface 76 to component 79.

Referring to FIG. 13, a timing diagram is illustrated corresponding to an embodiment of communication system 10 according to the present invention which utilizes slow-settling synthesizers within synthesizer component 79 to provide communications. The timing diagram of FIG. 13 is similar to the timing diagram of FIG. 11. Slots N−1, N, N+1, and N+2 are sequentially illustrated in time. Further, FIG. 13 includes a plurality of lines including time division multiple access (TDMA) frame structure line 160, frequency data line 161, first synthesizer load line 162, second synthesizer load line 163, first synthesizer frequency line 164, and second synthesizer frequency line 165.

Slots having a plurality of lengths are illustrated in FIG. 13. Slot data 167 communicated during slot N−1 and slot N comprises slot data corresponding to a double slot. The double slot comprises an initial active slot represented by slot N−1 followed by an inactive slot represented by slot N in FIG. 13. The active slot includes information regarding the double slot (e.g., information including communication frequency, size, transmit or receive slot, etc.). Respective slot data 168, 169 within slots N+1, N+2 comprise slot data for full slots.

Frequency data for a current slot is applied from synthesizer interface 76 to synthesizer component 79 during the previous slot in the arrangement depicted in FIG. 13. For example, synthesizer data 170 corresponding to slot N+1 is applied from interface 76 to component 79 during slot N−1 in accordance with the present invention. Similarly, synthesizer data 171, 172 correspond to respective slots N+2 and N+3 (slot N+3 is not shown in FIG. 13).

Enable signals 174, 175, 176 control loading of frequency data received within registers of synthesizer component 79 into desired first and second synthesizers. The first synthesizer of synthesizer component 79 is utilized to communicate slot data 168 as illustrated by line 164. The second synthesizer is utilized to communicate slot data 167 and slot data 169 as represented by line 165.

In accordance with the present invention, data processor 64 is configured to output frequency data corresponding to a subsequent slot (e.g., slot N+1) prior to communicating a current or previous slot (i.e., the illustrated double slot). In particular, data processor 64 is configured to control the output of frequency data corresponding to a subsequent slot comprising a full slot prior to communicating a previous slot comprising a double slot. Data processor 64 controls the output of frequency data during guard bands intermediate communication of adjacent slot data.

Data processor 64 identifies the current slot as a different slot (e.g., double slot following communication of plural full slots) from control information from control processor 63. In particular, data processor 64 identifies the current slot as having a length (e.g., double slot length) different than the length corresponding to the fixed pipeline delay (e.g., full slot length). Following identification of the current slot as such a slot, data processor 64 identifies the subsequent slot. If the subsequent slot is active, data processor 64 outputs frequency data corresponding to the subsequent slot from interface 76 to component 79 prior to communication of slot data 167 of the current slot.

Referring to FIG. 14, a timing diagram is illustrated corresponding to an embodiment of a communication system 10 according to the present invention which utilizes a fast-settling synthesizer within synthesizer component 79. The timing diagram of FIG. 14 is similar to the timing diagram of FIG. 12. Plural slots N−1, N, N+1, and N+2 are sequentially illustrated in time. Timing lines 180–183 are illustrated in FIG. 14. Line 180 comprises a time division multiple access (TDMA) frame structure line, line 181 illustrates a frequency data line, line 182 comprises a synthesizer load line, and line 183 comprises a frequency status line.

The depicted timing diagram illustrates communication of slots having different lengths. Referring to timing line 180, slot data 185 corresponds to slot data for a double slot. Respective slot data 186, 187 correspond to slot data for full slots. Slot data 185 is communicated during slot N−1 and slot N. Slot data 186, 187 are communicated during respectives slots N+1, N+2.

Referring to line 181, application of synthesizer data from interface 76 to component 79 is illustrated. Control signals 191, 192, 193 control loading of synthesizer data corresponding to respective slot data 185, 186, 187 from registers of component 79 into the synthesizer of component 79. Fast-settling operation of the synthesizer of synthesizer component 79 is illustrated by line 183.

Synthesizer data utilized to specify the frequency of the carrier signal to communicate slot data 185 is loaded during slot N−2 (not illustrated in FIG. 14). Synthesizer data 188 corresponding to slot N+1 is applied from synthesizer interface 76 to synthesizer component 79 prior to communication of double slot data 185 in accordance with the present invention. Synthesizer data 189, 190 are applied from synthesizer interface 76 to synthesizer components 79 prior to communication of slot data 186, 187 of the illustrated full slots.

Data processor 64 controls the outputting of frequency data from interface 76 to component 79 during guard bands intermediate slot data of adjacent slots. In fast-settling synthesizer applications, the frequency of the carrier signal generated by the synthesizer is also changed during the guard band. Slots can be communicated using the changed frequency. The illustrated double slot is communicated prior to the changing of the carrier frequency as illustrated by line 183 within slot N+1.

In other embodiments, data processor 64 identifies the length of the previous or current slot and thereafter identifies the subsequent slot using the length of the previous slot. Data processor 64 determines whether the subsequent slot is active following identification of the subsequent slot. If the subsequent slot is active, data processor 64 controls synthesizer interface 76 to output frequency data corresponding to the subsequent slot to component 79 prior to communicating slot data of the current slot.

Figure 15:
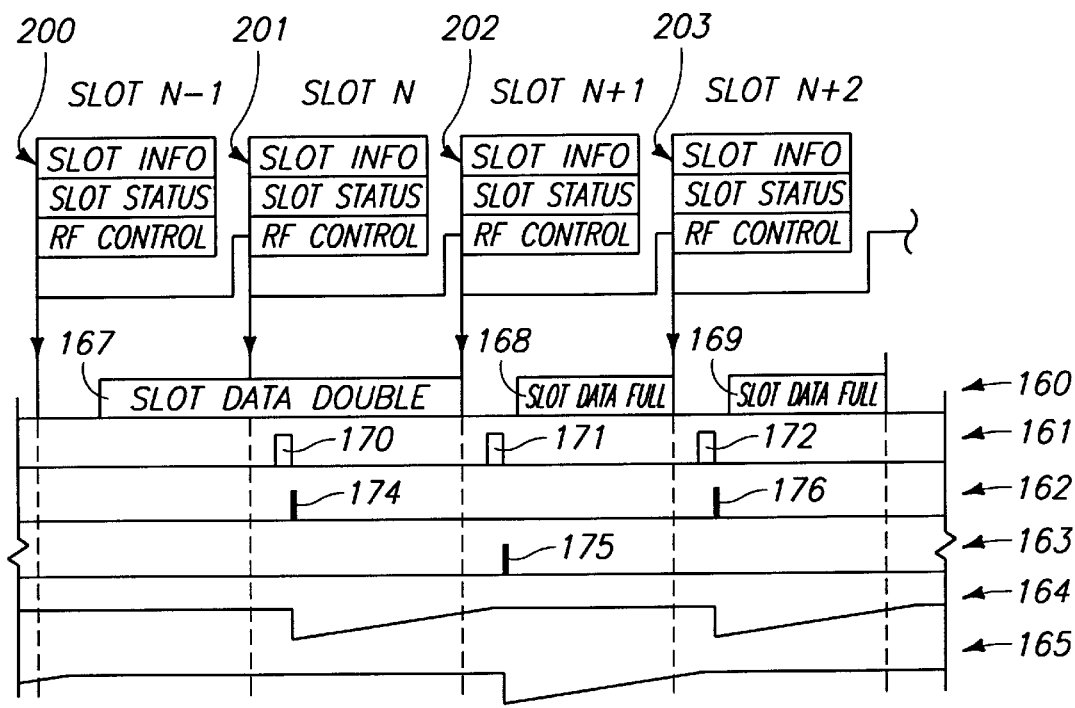
FIG. 15 is a timing diagram of slots of a conventional DECT communication system and associated slot information.
Figure 16:
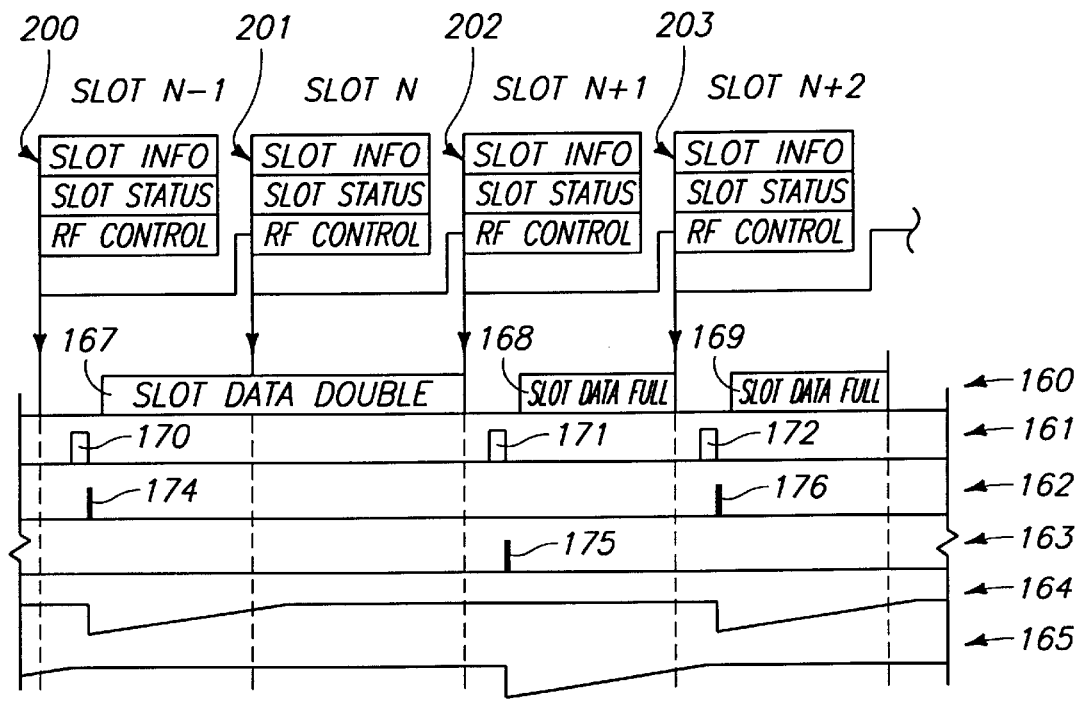
FIG. 16 is a timing diagram of slots of another conventional DECT communication system and associated slot information.
Figure 11B:
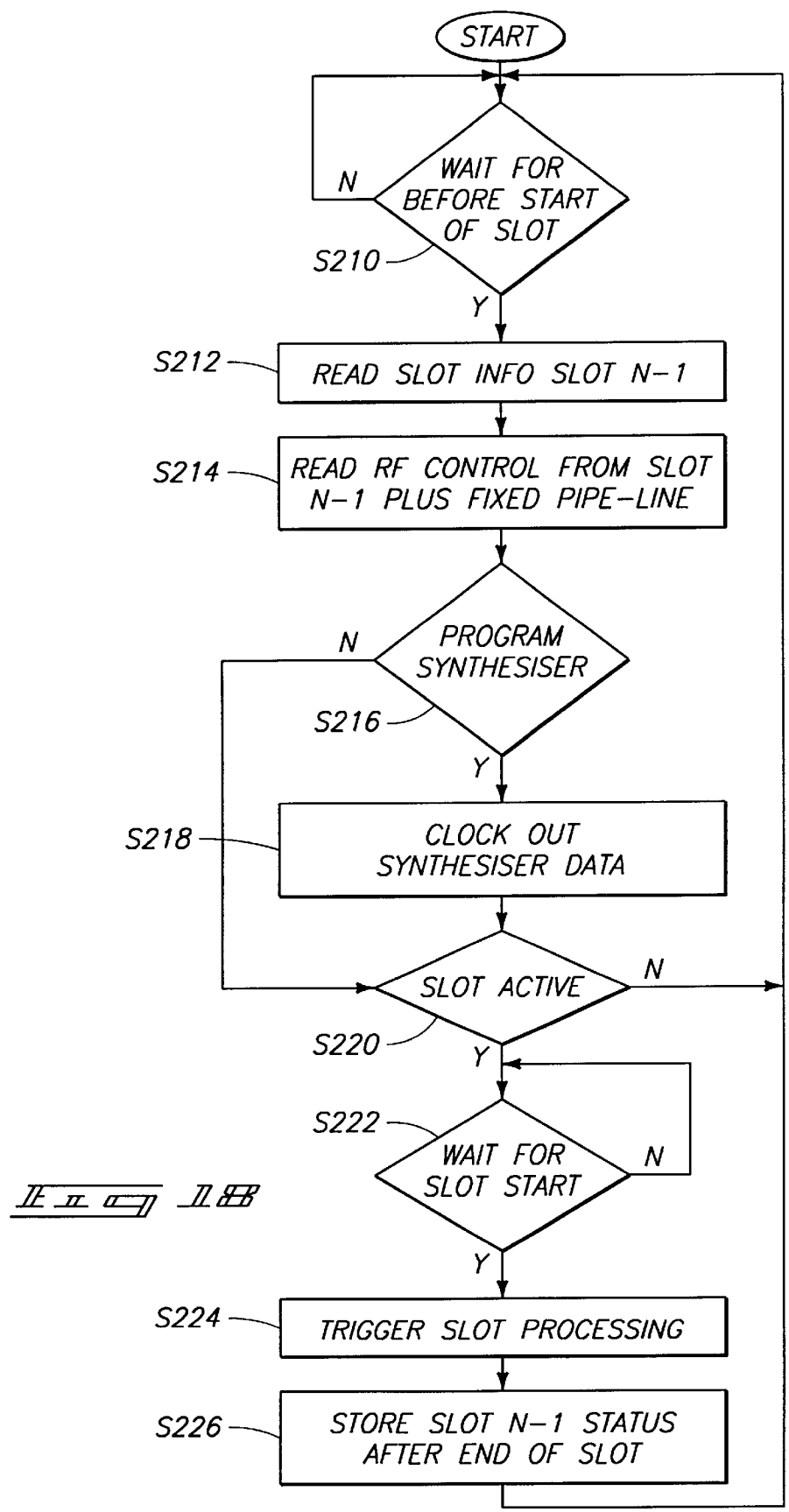

Referring to FIGS. 15–17, slot control information structure communication operations are illustrated. FIGS. 15–16 correspond to conventional fixed radio pipe delay configurations. FIG. 17 corresponds to a communication system configured in accordance with the present invention.

Referring to FIG. 15, a plurality of slot control blocks (SCB) 200–203 are sequentially provided with respect to slots N−1, N, N+1, and N+2. Individual slot control blocks 200–203 include slot communication information including slot information (slot info), slot status and RF control information.

In the conventional embodiment depicted in FIGS. 15–16, slot information for a given slot is provided in plural slot control blocks. More specifically, slot info and slot status information correspond to respective slots. However, RF control information for a given slot control block corresponds to a previous slot. More specifically, slot and slot status information from slot control block 200 correspond to slot N−1 in the configurations of FIGS. 15–16. RF control information from slot control block 201 is utilized for slot N−1 as illustrated in the fixed radio pipe delay embodiments of FIGS. 15–16. Such also corresponds to slots N, N+1 and N+2 within the conventional arrangements.

Fixed radio pipe delay embodiments experience problems when slots of different sizes are utilized. As previously described, RF control information, also referred to as synthesizer data, is applied to synthesizer component 79 during communication of double slot 167 in the embodiment of FIG. 15. Such may result in RF instability during communications.

Referring to FIG. 16, slot control blocks 200–203 for a conventional fixed radio pipe delay system configured to accommodate slots of different lengths are illustrated. As depicted in FIG. 16, slot info and slot status information of the illustrated slot control blocks 200–203 correspond to respective slots N–1, N, N+1, and N+2. However, RF control information is accessed from subsequent slot control blocks corresponding to the fixed pipeline delay configuration. To accommodate slots of different lengths, synthesizer programming for slot N+1 utilizes RF control information of slot N which is accessed a fixed pipeline delay prior to slot N (corresponding to the beginning of the double slot 167). Such conventional fixed radio pipeline delay configurations provide control information for slot N+1 into plural slot control blocks 201, 202 resulting in increased overhead for software implementation to accommodate different slot lengths.

Referring to FIG. 17, operations of an embodiment of communication system 10 according to the present invention are described. Slot control information for the communication system 10 is structured in a slot by slot basis. Plural slot control blocks 200–203 are illustrated corresponding to respective slots N–1, N, N+1, and N+2. Control processor 63 is configured to generate slot control blocks in the depicted embodiment.

Individual slot control blocks 200–203 include slot communication information comprising slot info, slot status and RF control information for respective slots N–1, N, N+1, and N+2. Slot info provides information for configuring a slot (e.g., defining a transmit or receive slot, encryption, etc.). Slot status information corresponds to synchronization information, CRC information, RSSI information and is typically stored at the end of the corresponding slot. RF control information provides appropriate radio information for providing communications of synthesizer component 79 of radio 55.

Communication system 10 configured to operate in accordance with FIG. 17 is arranged to provide single slot control block data structures for respective slots, including RF control information for dynamic pipe delay embodiments communicating slots of different lengths. In particular, following detection of a double slot 167, communication system 10 according to the present invention is configured to utilize RF control information from slot control block 202 to program synthesizer component 79 for transmission of slot N+1.

Thus, it follows that slot communication information (slot info, slot status, RF control information) utilized for communicating an individual slot (e.g., slot N+1) is provided within a single slot control block (e.g., slot control block 202). Such requires less overhead and eliminates the need for dynamic management by software where slots of different lengths are communicated.

Referring to FIG. 18, a flow diagram illustrating operation of conventional fixed pipe delay communication systems configured to accommodate slots of different lengths is described. Operations of the conventional communication systems are described with reference to slots of FIG. 16. Initially, a time period before the start of a slot (e.g., slot N–1) is detected at step S210. Following the detection of the time period before the start of a slot, slot info corresponding to the slot is read from the corresponding slot control block (e.g., slot control block 200) at step S212.

During step S214, RF control information 170 is read from a slot control block indicated by the current slot (N–1) plus a fixed pipe delay (e.g., slot control block 201). The read RF control information represented by numeral 170 in FIG. 16 corresponds to slot N+1. Slot info and slot status communication information for slot N+1 is provided within slot control block 202. Thus, communication data corresponding to a single slot (e.g., slot N+1 of FIG. 16) is provided within two slot control blocks (e.g., RF control information within slot control block 201 and slot info and slot status information within slot control block 202).

At step S216, it is determined if the RF control information of the pipelined ahead slot (slot N) indicates that the synthesizer needs to be programmed (i.e., whether slot N+1 is active). The conventional system goes to step S220 for further processing of the current slot if progammation is not required. If programming is necessary, synthesizer data is clocked out at step S218 using enable signal 174 illustrated in FIG. 16.

The previously read slot info from slot control block 200 is analyzed to determine whether the current slot (slot N–1) needs to be processed (i.e., whether it is an active slot) at step S220. The conventional system is configured to return to step S210 for the next slot (slot N) if the current slot (slot N–1) is not active. If the current slot is active, the beginning of the slot is monitored at step S222. Once the beginning of the slot is detected, processing of the slot (e.g., communication of double slot 167) is commenced at step S224. At step S226, a flag is set to enable, following slot processing, slot status information for the slot (slot N–1) to be stored at the end of the slot. Thereafter, a next slot (slot N) may be processed restarting at step S210.

Figure 19:
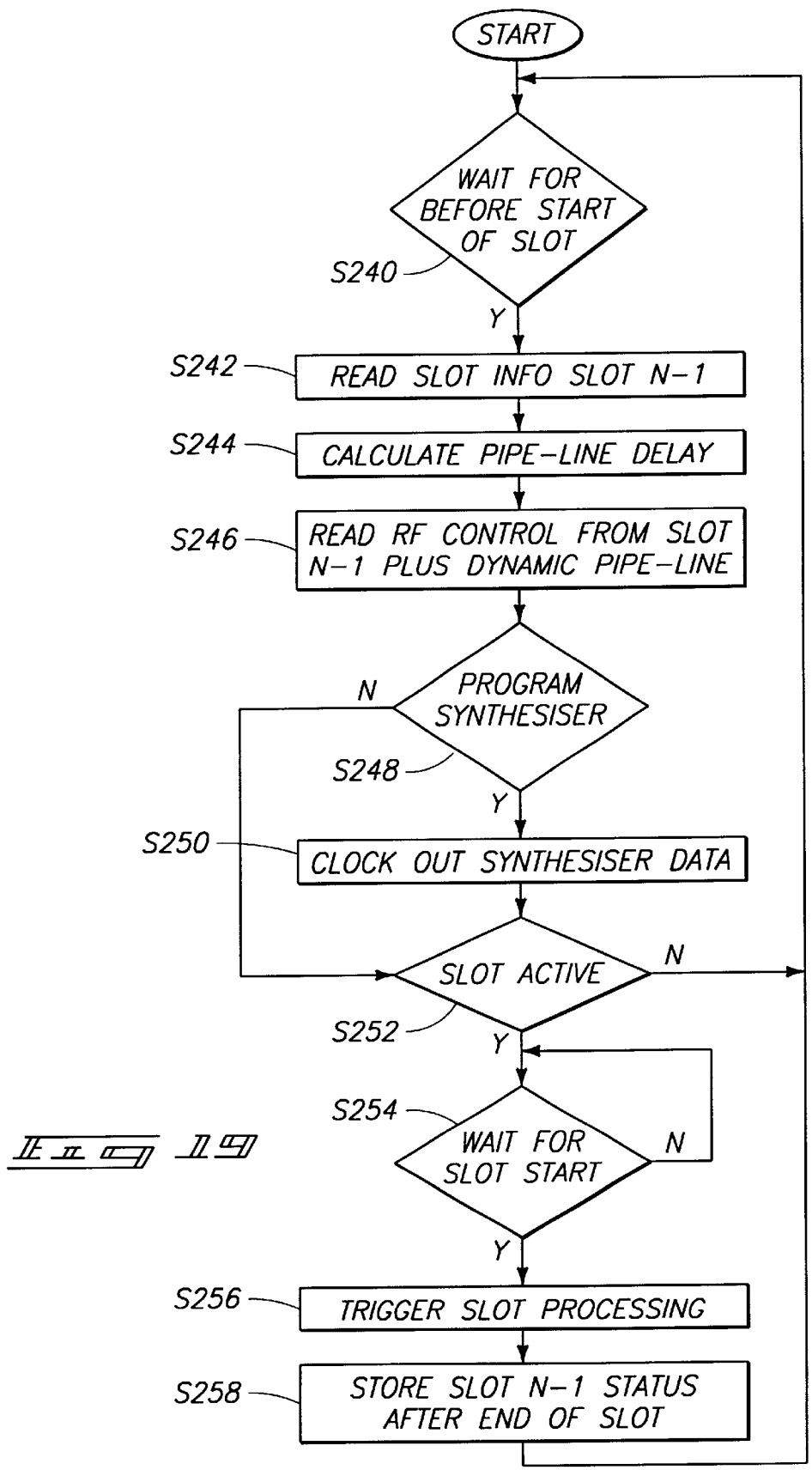
FIG. 19 is a state machine diagram for a controller of a communication system according to the present invention.

Referring to FIG. 19, state machine operations of direct memory access controller 70 of communication system 10 are described. The depicted state machine operation is executed for individual slots. Controller 70 is configured to fetch slot control blocks including control information from shared memory 62. Reference timer 74, depicted in FIG. 6, provides slot timing information in the described embodiment. Reference timer 74 is configured to provide "before start of slot" and "start of slot" timing information as discussed below.

Operations of communication system 10 according to the present invention are hereafter described with reference to slots shown in FIG. 17. Initially, controller 70 begins fetching data from a slot control block by utilizing a slot pointer associated with the slot. Slot pointers and associated slot control blocks are stored within shared memory 62. The slot pointers identify the slot control block containing slot information for the slot to be processed. Once the state machine is triggered, access to appropriate slot control blocks in shared memory 62 is requested from controller 70. Controller 70 reads the appropriate information from shared memory 62.

Referring to FIGS. 17 and 19, a time period before the start of a slot (e.g., slot N–1) is detected at step S240. Following the detection of the time period before the start of a slot, slot info corresponding to the slot (slot N–1) is read from the corresponding slot control block (e.g., slot control block 200) at step S242. During step S244, the dynamic pipeline delay is calculated including determining the length of a current slot (e.g., slot N−1 double slot 167) and whether the next slot (e.g., slot N+1 full slot 168) is active.

RF control information for the next active slot (slot N+1) is read at step S246. The RF control information is read from a slot control block corresponding to the current slot (e.g., slot N−1) plus the dynamic pipeline delay calculated from step S244. Here, the RF control information is read from slot control block 202 (slot N+1). Thus, slot communication information or data corresponding to one slot (e.g., slot N+1) is provided within a single slot control block (slot control block 202).

At step S248, the RF control information of the pipelined ahead slot (slot N+1) is analyzed to determine whether synthesizer 79 needs to be programmed to communicate full slot 168. The controller 70 goes to step S252 for processing of the current slot (slot N−1) if progammation is not required. If programmation is necessary, RF control information or synthesizer data is clocked out at step S250 using enable signal 174 of FIG. 17. More specifically, once the appropriate RF control information is read and it is determined synthesizer component 79 needs to be programmed, a command (signal 174) is issued to synthesizer interface 76 to clock out the synthesizer data from the RF control information of the slot control block.

The previously read slot info from slot control block 200 is analyzed to determine whether the current slot (slot N−1) needs to be processed (i.e., whether it is an active slot) at step S252. Controller 70 is configured to return to step S240 for the next slot (slot N) if the current slot is not active. If the current slot is active, the beginning of the slot is monitored at step S254. Once the beginning of the slot is detected, processing of the slot (e.g., communication of double slot 167) is commenced at step S256. In the described embodiment, controller 70 issues a command to TX/RX data path 72 and radio signal controller 75 if the current slot is to be processed.

At step S258 controller 70 sets a flag to enable, following slot processing (processing of double slot 167 of FIG. 17), slot status information for the slot (slot N−1) to be stored at the end of the slot. After step S258, a next slot (e.g., slot N) may be processed restarting at step S240.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A communication system comprising:
    a radio having a synthesizer operable to generate a carrier signal responsive to frequency data, the radio being configured to communicate a plurality of slots using the carrier signal;
    a control processor configured to generate control information regarding the slots; and
    a data processor coupled with the radio and the control processor, the data processor being configured to use the control information to identify a first slot and a subsequent slot responsive to the identification of the first slot, the data processor being further configured to control the output of frequency data to the radio responsive to the identification of the first slot and the subsequent slot.

2. The communication system according to claim 1 wherein the data processor includes a multiple access processor configured to provide conversion operations of a data signal to a plurality of slots.

3. The communication system according to claim 1 wherein the data processor comprises integrated circuitry.

4. The communication system according to claim 1 wherein the data processor is configured to control the output of the frequency data to the synthesizer within a guard band intermediate slot data of adjacent slots.

5. The communication system according to claim 1 wherein the data processor is configured to control the output of frequency data corresponding to the subsequent slot to the synthesizer prior to communication of the first slot.

6. The communication system according to claim 1 wherein the data processor is configured to identify the length of the first slot.

7. The communication system according to claim 1 wherein the data processor is configured to identify the type of the subsequent slot.

8. The communication system according to claim 1 wherein the data processor is configured to vary the timing of outputting of the frequency data to the radio.

9. The communication system according to claim 1 wherein the data processor is configured to vary the timing of outputting of the frequency data to the radio responsive to the first slot being a double slot and the subsequent slot being an active slot.

10. The communication system according to claim 1 wherein the communication system comprises a DECT communication system.

11. The communication system according to claim 1 wherein the first slot and second slot have different lengths.

12. The communication system according to claim 1 wherein the radio comprises:
    a first synthesizer configured to generate a carrier signal to communicate the first slot; and
    a second synthesizer configured to generate a carrier signal to communicate the subsequent slot.

13. The communication system according to claim 12 wherein the data processor is configured to control the output of frequency data corresponding to the subsequent slot to the second synthesizer before communication of the first slot using the first synthesizer.

14. A communication method comprising:
    providing a carrier signal having a frequency;
    communicating a plurality of slots including a first slot and a subsequent slot using the carrier signal;
    identifying the first slot;
    identifying the subsequent slot responsive to the identifying the first slot;
    outputting frequency data responsive to the identifying the subsequent slot; and
    changing the frequency of the carrier signal responsive to the outputted frequency data.

15. The method according to claim 14 further comprising converting the slots into a data signal.

16. The method according to claim 14 wherein the outputting and changing comprise outputting and changing during a guard band intermediate slot data of adjacent slots.

17. The method according to claim 14 wherein the identifyings comprise using integrated circuitry.

18. The method according to claim 14 wherein the outputting comprises outputting frequency data corresponding to the subsequent slot prior to communicating the first slot.

19. The method according to claim 14 wherein the outputting comprises outputting frequency data corresponding to a subsequent slot comprising a full slot prior to communicating the first slot comprising a double slot.

20. The method according to claim 14 wherein the identifying the first slot comprises identifying the length of the first slot.

21. The method according to claim 14 wherein the identifying the subsequent slot comprises identifying the type of the subsequent slot.

22. The method according to claim 14 wherein the communicating comprises communicating the first slot using a first synthesizer and communicating the second slot using a second synthesizer.

23. The method according to claim 22 wherein the outputting comprises outputting frequency data corresponding to the subsequent slot to the second synthesizer before communication of the first slot using the first synthesizer.

24. The method according to claim 14 further comprising communicating the subsequent slot using the changed frequency.

25. The method according to claim 14 further comprising communicating the first slot before the changing.

26. The method according to claim 14 wherein the communicating comprises communicating slots having a plurality of lengths.

27. The method according to claim 14 wherein the communicating comprises communicating DECT slots.

28. The method according to claim 14 further comprising communicating the subsequent slot using the outputted frequency data following the communicating of the first slot.

29. The method according to claim 14 further comprising varying the timing of the outputting responsive to the identifying the first and subsequent slots.

30. The method according to claim 14 wherein the providing includes generating a carrier signal using a synthesizer and the outputting comprises outputting the frequency data to the synthesizer.

31. The method according to claim 14 further comprising varying the timing of the outputting responsive to identifying the length of the first slot.

32. A communication method comprising:
communicating a plurality of slots including a first slot and a subsequent slot;
identifying the first slot;
identifying the subsequent slot responsive to the identifying the first slot;
outputting frequency data regarding the subsequent slot responsive to the identifyings; and
communicating the first slot following the outputting.

33. The method according to claim 32 further comprising converting the slots into a data signal.

34. The method according to claim 32 wherein the outputting comprises outputting during a guard band intermediate slot data of adjacent slots.

35. The method according to claim 32 wherein the identifyings comprise using integrated circuitry.

36. The method according to claim 32 wherein the outputting comprises outputting frequency data corresponding to the subsequent slot prior to communicating the first slot.

37. The method according to claim 32 wherein the outputting comprises outputting to a synthesizer.

38. The method according to claim 32 wherein the communicating comprises communicating slots having a plurality of lengths.

39. The method according to claim 32 wherein the identifying the first slot comprises identifying the length of the first slot.

40. The method according to claim 32 wherein the identifying the subsequent slot comprises identifying the type of the subsequent slot.

41. The method according to claim 32 further comprising communicating the subsequent slot using the outputted frequency data.

42. The method according to claim 32 wherein the communicating comprises communicating DECT slots.

43. The method according to claim 32 further comprising varying the timing of the outputting responsive to the identifying the first and subsequent slots.

44. A communication method comprising:
providing data in a plurality of DECT slots;
generating a carrier signal using a synthesizer;
communicating slot data of the DECT slots using the carrier signal;
generating frequency data corresponding to the DECT slots;
outputting frequency data to the synthesizer intermediate communication of slot data of adjacent DECT slots;
changing the frequency of the carrier signal responsive to the outputting of the frequency data; and
varying the timing of the outputting of the frequency data.

45. The method according to claim 44 further comprising identifying a first DECT slot and a subsequent DECT slot.

46. The method according to claim 45 wherein the varying is responsive to the identifying.

47. The method according to claim 44 wherein the communicating comprises communicating DECT slots having a plurality of lengths.

48. The method according to claim 44 wherein the outputting comprises outputting during a guard band intermediate slot data of adjacent DECT slots.

49. The method according to claim 44 wherein the varying is responsive to identifying the length of a DECT slot.

50. The method according to claim 44 further comprising communicating using the carrier signal having a changed frequency.

51. A method of communicating data within a DECT communication system comprising:
forming a first DECT slot and a subsequent DECT slot;
generating first frequency data corresponding to the first DECT slot and second frequency data corresponding to the subsequent slot;
identifying the length of the first DECT slot;
identifying the subsequent DECT slot;
outputting the first frequency data to a synthesizer;
loading the synthesizer with the first frequency data;
settling the synthesizer at the first frequency following the loading the synthesizer with the first frequency data;
generating a carrier signal having the first frequency;
communicating the first slot using the first frequency carrier signal;
outputting the second frequency data to the synthesizer responsive to identifying the subsequent slot as an active slot, the outputting occurring prior to the communicating the first slot;
loading the synthesizer with the second frequency data;
adjusting the synthesizer according to the second frequency data;
settling the synthesizer at the second frequency following the loading the synthesizer with the second frequency data;

generating another carrier signal having the second frequency;

communicating the subsequent slot using the second frequency carrier signal; and varying the timing of one of the outputtings responsive to identifying the first and second DECT slots.

* * * * *